US012664002B2

(12) United States Patent
Harun et al.

(10) Patent No.: US 12,664,002 B2
(45) Date of Patent: Jun. 23, 2026

(54) SHARED COMPONENTS FOR CONFIGURATION DATA MANAGEMENT

(71) Applicant: ServiceNow, Inc., Santa Clara, CA (US)

(72) Inventors: Mark Jason Harun, Brussels (BE); Hyung Kim, Seattle, WA (US); Ravindra Bansal, Santa Clara, CA (US); Benny Van de Sompele, Brussels (BE); Swapnesh Patel, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 280 days.

(21) Appl. No.: 18/384,124

(22) Filed: Oct. 26, 2023

(65) Prior Publication Data

US 2025/0138836 A1 May 1, 2025

(51) Int. Cl.
G06F 9/445 (2018.01)
G06F 3/0482 (2013.01)

(52) U.S. Cl.
CPC ........ G06F 9/44505 (2013.01); G06F 3/0482 (2013.01)

(58) Field of Classification Search
None
See application file for complete search history.

(56) References Cited

U.S. PATENT DOCUMENTS 4,941,084 A 7/1990 Terada
5,185,860 A 2/1993 Wu

| | | |
|---|---|---|
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |

(Continued)

FOREIGN PATENT DOCUMENTS

| EP | 0433979 A2 | 6/1991 |
|---|---|---|
| EP | 1607824 A2 | 12/2005 |

(Continued)

OTHER PUBLICATIONS

Cao et al., "Support mechanisms for cloud configuration using XML filtering techniques: A case study in SaaS," Elsevier, 2019. ( Year: 2019).*

(Continued)

*Primary Examiner* — Ryan D. Coyer
(74) *Attorney, Agent, or Firm* — McDonnell Boehnen Hulbert & Berghoff LLP

(57) ABSTRACT

An embodiment may involve obtaining a configuration data component that is associated with a first configuration data library and the configuration data component may indicate one or more parameters of a software service, providing a request for the configuration data component to be used in a second configuration data library, and linking the configuration data component with the second configuration data library such that the configuration data component is used across the first configuration data library and the second configuration data library.

19 Claims, 22 Drawing Sheets

(56) References Cited

U.S. PATENT DOCUMENTS

| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Joe |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,328,260 B1 | 2/2008 | Muthiyan |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 9,069,737 B1 | 6/2015 | Kimotho |
| 9,971,826 B1 | 5/2018 | Belmar |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,294,666 B1 | 4/2022 | Look |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,582,106 B2 | 2/2023 | Hameiri |
| 11,616,690 B2 | 3/2023 | Feiguine |
| 11,630,717 B2 | 4/2023 | Vutukuru |
| 11,632,303 B2 | 4/2023 | Bitterfeld |
| 11,640,369 B2 | 5/2023 | Bhogle |
| 11,671,444 B2 | 6/2023 | Waplington |
| 11,695,641 B2 | 7/2023 | Bar Oz |
| 11,888,684 B1 * | 1/2024 | Sans ............... G06F 9/44505 |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0288053 A1 | 12/2006 | Holt |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2010/0257508 A1 * | 10/2010 | Bajaj ............... G06F 9/44563 |
| | | 717/111 |
| 2013/0283273 A1 | 10/2013 | Miyazaki |
| 2014/0122427 A1 | 5/2014 | Dary |
| 2017/0118268 A1 * | 4/2017 | Wu ................ H04L 67/10 |
| 2018/0123940 A1 | 5/2018 | Rimar |
| 2019/0073257 A1 | 3/2019 | Dasgupta |
| 2019/0095189 A1 * | 3/2019 | Feigen ............ G06F 9/44505 |
| 2019/0104398 A1 | 4/2019 | Owen |
| 2019/0108245 A1 * | 4/2019 | Bentley ............ G06F 16/212 |
| 2019/0129739 A1 | 5/2019 | Al Reza |
| 2019/0149515 A1 | 5/2019 | Sharma |
| 2019/0165957 A1 | 5/2019 | Abbott |
| 2019/0342162 A1 | 11/2019 | Bendre |
| 2020/0034462 A1 | 1/2020 | Narayanasamy |
| 2020/0050689 A1 | 2/2020 | Tal |
| 2020/0204443 A1 | 6/2020 | Bar Oz |
| 2020/0285547 A1 * | 9/2020 | Shukla ............. G06N 20/00 |
| 2020/0301678 A1 | 9/2020 | Burman |
| 2020/0313957 A1 * | 10/2020 | A ................ H04L 41/0859 |

(56) References Cited

U.S. PATENT DOCUMENTS

| | | | |
|---|---|---|---|
| 2021/0097168 A1 | 4/2021 | Patel | |
| 2021/0194764 A1 | 6/2021 | Badyan | |
| 2022/0276842 A1* | 9/2022 | Delpech de Frayssinet | |
| | | | G06F 8/36 |
| 2023/0123011 A1* | 4/2023 | Moser | G06F 16/258 |
| | | | 718/1 |
| 2024/0134841 A1* | 4/2024 | Ubach | H04L 67/12 |
| 2025/0103370 A1* | 3/2025 | Schneider | G06F 9/45558 |

FOREIGN PATENT DOCUMENTS

| | | | |
|---|---|---|---|
| EP | 2093964 | A1 | 8/2009 |
| KR | 20060114625 | A | 11/2006 |
| WO | 9934285 | W | 7/1999 |
| WO | 0052559 | W | 9/2000 |
| WO | 0179970 | W | 10/2001 |

OTHER PUBLICATIONS

Mohamed et al., "An Integrated Platform for Dynamic Adaptation of Multi-Tenant Single Instance SaaS Applications," IEEE, 2017. (Year: 2017).*

Orosz et al., "Software as a Service operation model in cloud based ERP systems," IEEE, 2019. (Year: 2019).*

International Search Report and Written Opinion, PCT Application PCT/US2024/049816, mailed Jan. 3, 2025.

Jain, Prashant & Schmidt, Douglas. (1997). Dynamically Configuring Communication Services with the Service Configurator Pattern.

Oberle, D., Eberhart, A., Staab, S., Volz, R. (2004). Developing and Managing Software Components in an Ontology-Based Application Server. In: Jacobsen, HA. (eds) Middleware 2004. Lecture Notes in Computer Science, vol. 3231. Springer, Berlin, Heidelberg. https://doi.org/10.1007/978-3-540-30229-2_24.

U.S. Appl. No. 18/076,736, filed Dec. 7, 2022.

U.S. Appl. No. 18/076,744, filed Dec. 7, 2022.

* cited by examiner

FIG. 6B

```
{
   "Now Airline Booking": {
      "Testing Environment": {
         "User Authentication Login Service": {
            "OAUTH Provider Integration": {
               "url": "https://sandbox.oauth-provider.net",
               "claims": ["address", "email", "username"]
            },
            "Custom Authentication Microservice": {
               "docker-repository": "NowAir",
               "docker-container": "now/auth",
               "docker-host": "AWS-XL1",
               "listen-url": "http://10.10.0.1/auth",
               "database": "UserAccounts",
               "database-server": "10.10.100.1",
               "database-port": 3306
            },
         },
         "Transaction Service": {
            "Gateway": {
               "ID Number" : "Airline92122",
               "URL": "http://sandbox.example.com/transactions",
               "Password": "*******"
            },
            "Gateway": {
               "ID Number": "Airline7150",
               "URL": "https://sandbox.transactions_handler.com"
            }
         },
         "UI Webserver": {
            "domain": "testing.NowAir.com",
            "dns-server": "10.53.53.53",
            "Reverse Proxy": {
               "external-ip": "10.10.10.1",
               "internal-ip": "10.0.0.100"
            }
            "load-balancer": {
               "listen": "10.0.0.100",
               "strategy": "round-robin",
               "targets":        [       "webtest1.nowair.com",        "webtest2.nowair.com",
"webtest3.nowair.com" ]
            },
         },
      ...
```

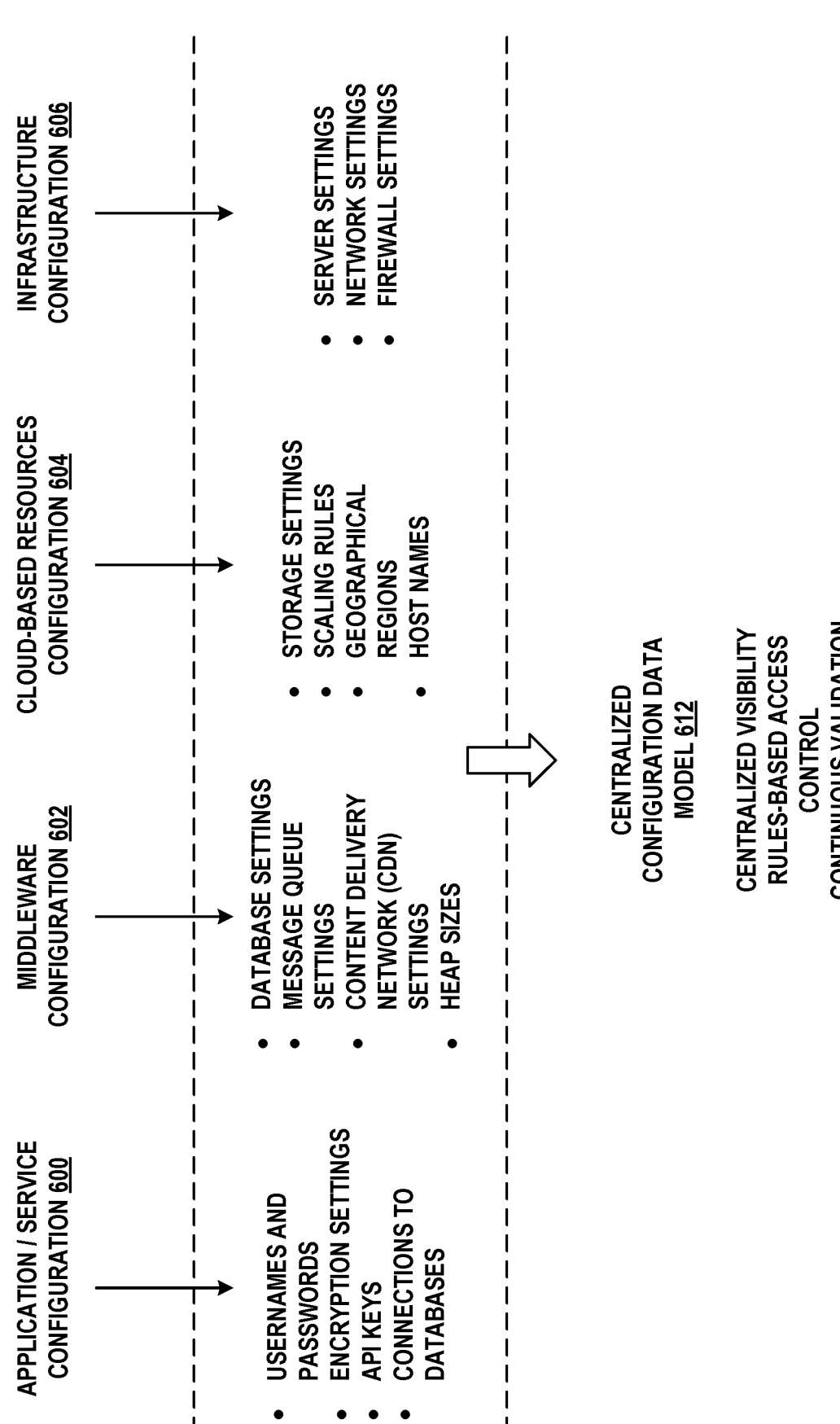

APPLICATION / SERVICE CONFIGURATION 600

- USERNAMES AND PASSWORDS
- ENCRYPTION SETTINGS
- API KEYS
- CONNECTIONS TO DATABASES

MIDDLEWARE CONFIGURATION 602

- DATABASE SETTINGS
- MESSAGE QUEUE SETTINGS
- CONTENT DELIVERY NETWORK (CDN) SETTINGS
- HEAP SIZES

CLOUD-BASED RESOURCES CONFIGURATION 604

- STORAGE SETTINGS
- SCALING RULES
- GEOGRAPHICAL REGIONS
- HOST NAMES

INFRASTRUCTURE CONFIGURATION 606

- SERVER SETTINGS
- NETWORK SETTINGS
- FIREWALL SETTINGS

CENTRALIZED CONFIGURATION DATA MODEL 612

CENTRALIZED VISIBILITY
RULES-BASED ACCESS CONTROL
CONTINUOUS VALIDATION

FIG. 6C

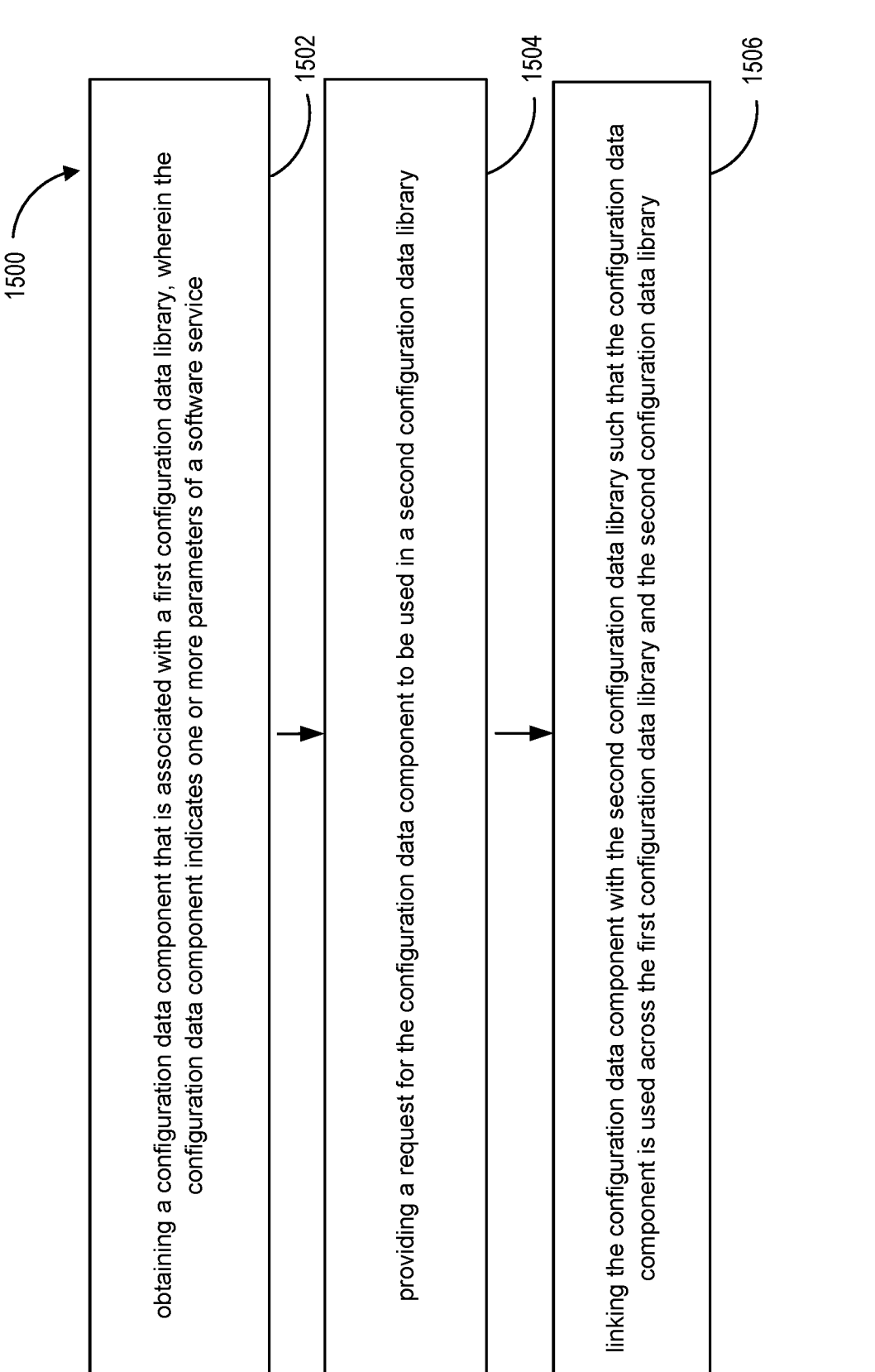

1500

1502 obtaining a configuration data component that is associated with a first configuration data library, wherein the configuration data component indicates one or more parameters of a software service 1504 providing a request for the configuration data component to be used in a second configuration data library 1506 linking the configuration data component with the second configuration data library such that the configuration data component is used across the first configuration data library and the second configuration data library

FIG. 15

SHARED COMPONENTS FOR CONFIGURATION DATA MANAGEMENT

BACKGROUND

A computing platform may be large and complex, simultaneously supporting hundreds or thousands of software applications, as well as higher-level services facilitated by groups of software applications operating in conjunction with one another. As a consequence, the computing platform may have anywhere from tens of thousands to millions of individually configurable parameters that control the operation of the platform, the software applications, and/or the services. These parameters are sometimes collectively referred to as configuration data.

In many realistic scenarios, configuration data can change frequently. For example, agile or rapid software development procedures may supply updates to configuration data parameters thousands of times per day across the platform as a whole. Some specific parameters may be changed several times per day or week as the software applications and/or their usage evolve. Further, configuration data may be stored in multiple locations within the computing platform or even external to the platform.

As these parameters are changed, misconfigurations may occur with some involving discrepancies between values of a parameter stored within the platform and the value of an equivalent parameter stored elsewhere (e.g., in another location within the platform or external to the platform). As a consequence, it is believed that configuration errors (e.g., one or more parameters taking on incorrect values) are now responsible for more system downtime, defects, and faults than software coding errors. Additionally, unnecessary duplication of configuration data parameters may result in waste of storage space, use of compute resources that may be better used for other purposes, and/or other resource inefficiencies.

SUMMARY

Various implementations disclosed herein overcome these and possibly other technical problems by providing techniques for centralizing configuration data that facilitate more robust methods for changing this data, and avoiding unnecessary parameter duplications. To do so, the implementations introduce shared components. Shared components allow a single component of configuration data (which may be one or more specific parameters of the configuration data) to be shared between several applications or services. Therefore, changes to the parameters within such a shared component can be effectuated and deployed more efficiently, as only the shared component would need to be updated. This approach additionally reduces memory and processor utilization of the affected applications or services and thus reduces usage of limited computing resources.

Accordingly, a first example embodiment may involve obtaining a configuration data component that is associated with a first configuration data library, wherein the configuration data component indicates one or more parameters of a software service. The first example embodiment may also involve providing a request for the configuration data component to be used in a second configuration data library. The first example embodiment may also involve linking the configuration data component with the second configuration data library such that the configuration data component is used across the first configuration data library and the second configuration data library.

In a second example embodiment, a computing system may include at least one processor, as well as memory and program instructions. The program instructions may be stored in the memory, and upon execution by the at least one processor, cause the computing system to perform operations in accordance with the first embodiment.

A third example embodiment may involve a non-transitory computer-readable medium, having stored thereon program instructions that, upon execution by a computing system, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B provides a simplified set of configuration data for a software service, in accordance with example embodiments.

FIG. 6C illustrates centralized storage of configuration data, in accordance with example embodiments.

FIG. 15 is a flow chart, in accordance with example embodiments.

DETAILED DESCRIPTION

Figure 1:
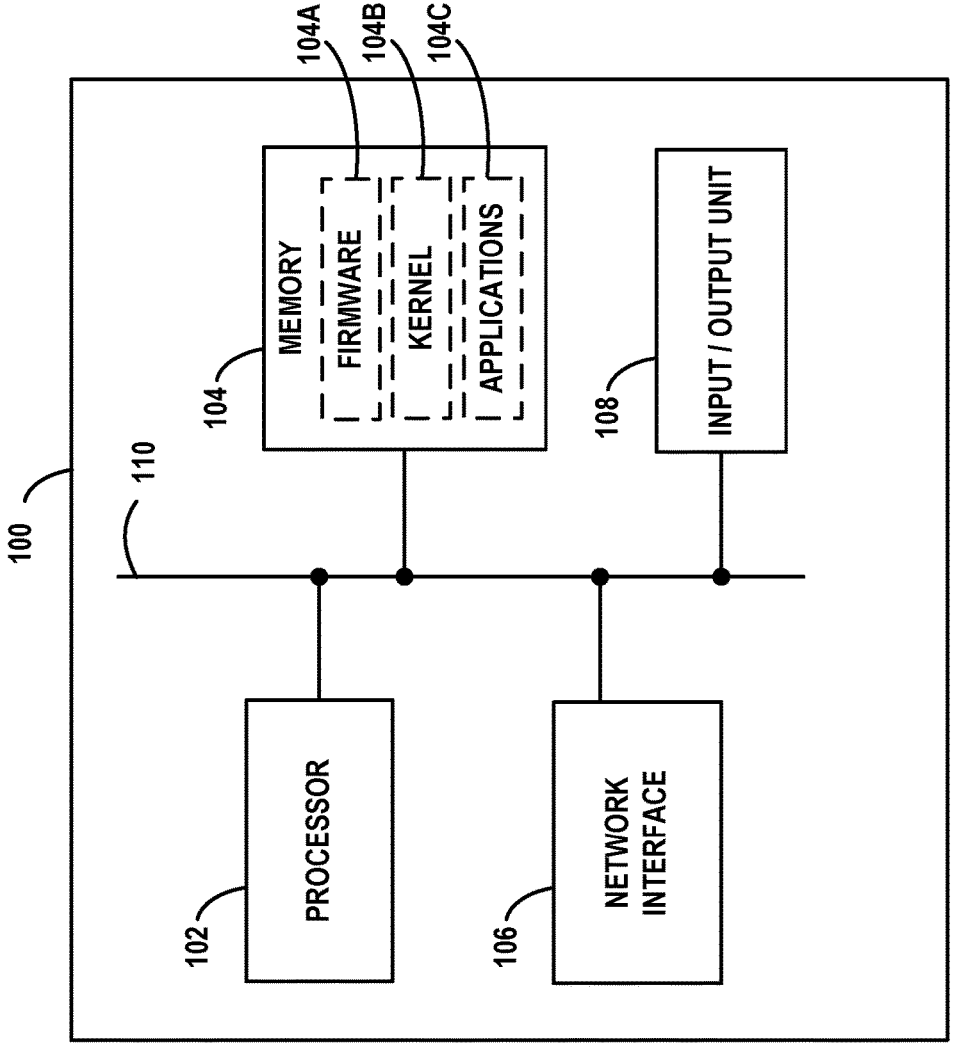
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
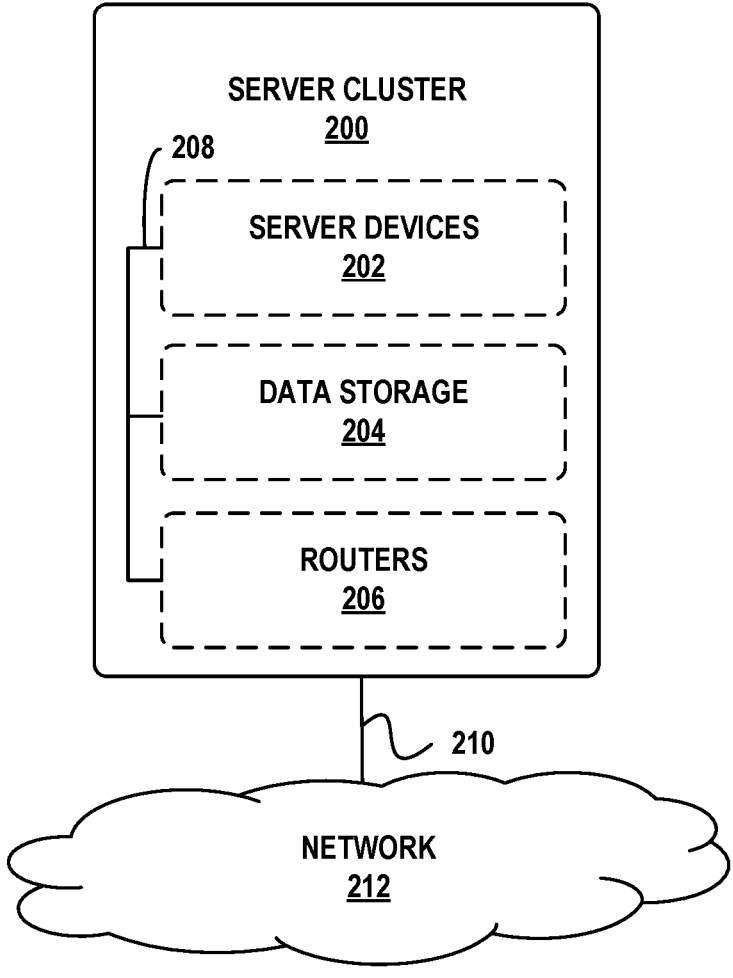
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. In some embodiments, other types of memory may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
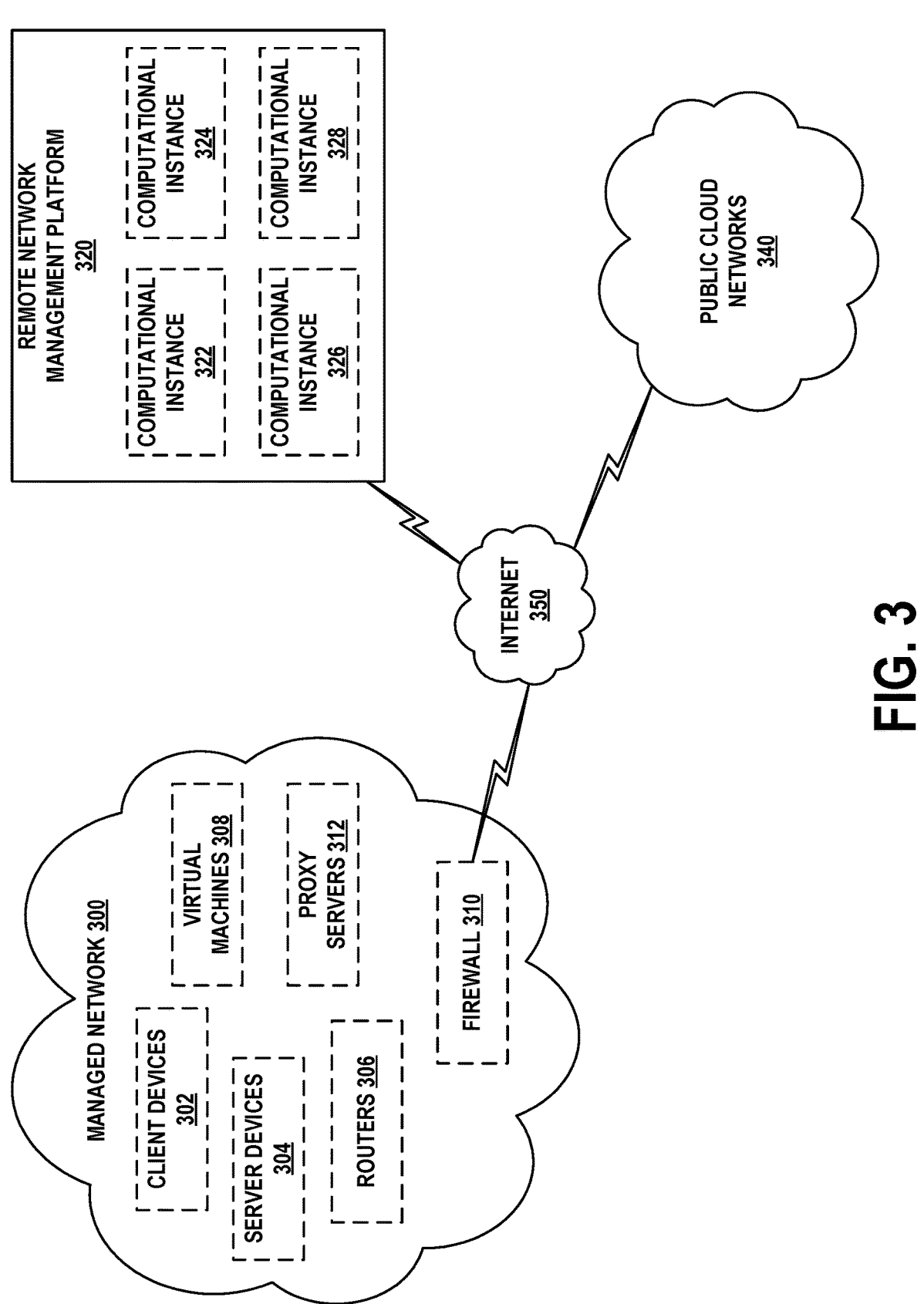
FIG. 3 depicts a remote network management architecture, in accordance with example embodiments.

FIG. 3 depicts a remote network management architecture, in accordance with example embodiments. This architecture includes three main components-managed network 300, remote network management platform 320, and public cloud networks 340-all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
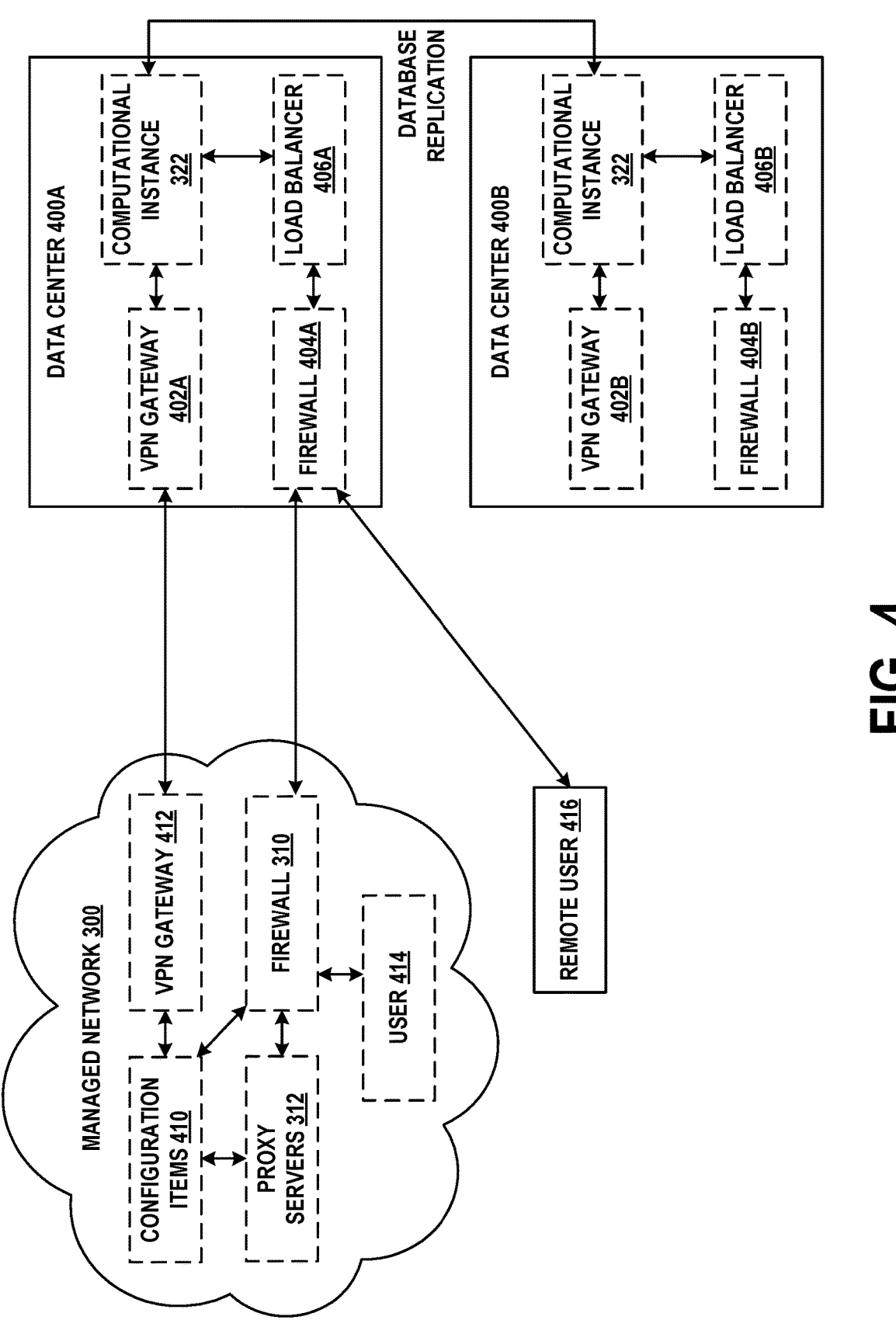
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
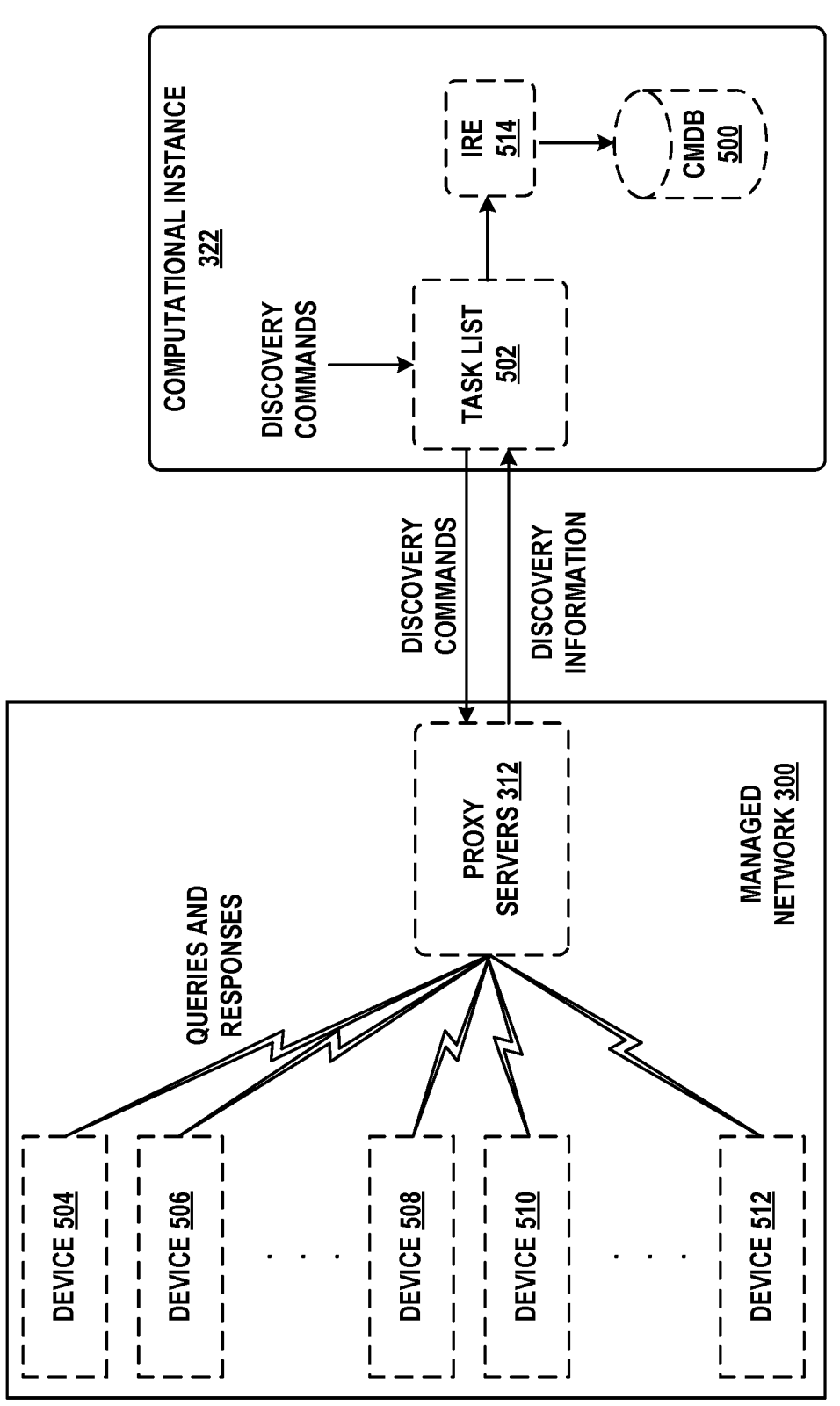
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance.

These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Working with Configuration Data

As described above, a remote network management platform (such as remote network management platform 320) may support a vast array of software applications and services. Each of these may have its own configuration data, which could reside by default in one or more files or database entries within or outside of the platform.

The configuration data may be made up of sets of parameters, where a parameter may be a key-value pair, one or more alphanumeric values, a file, or some other type of content. For purposes of discussion herein, it may be assumed that parameters take the form of key-value pairs but other parameter forms may be employed. An example of a key-value pair is "ip-address: 10.0.177.15", where the key is the text "ip-address" and the value is the IP address "10.0.177.15". Key-value pairs can be stored in various types of structured or unstructured text files, database tables, and so on.

Figure 6A:
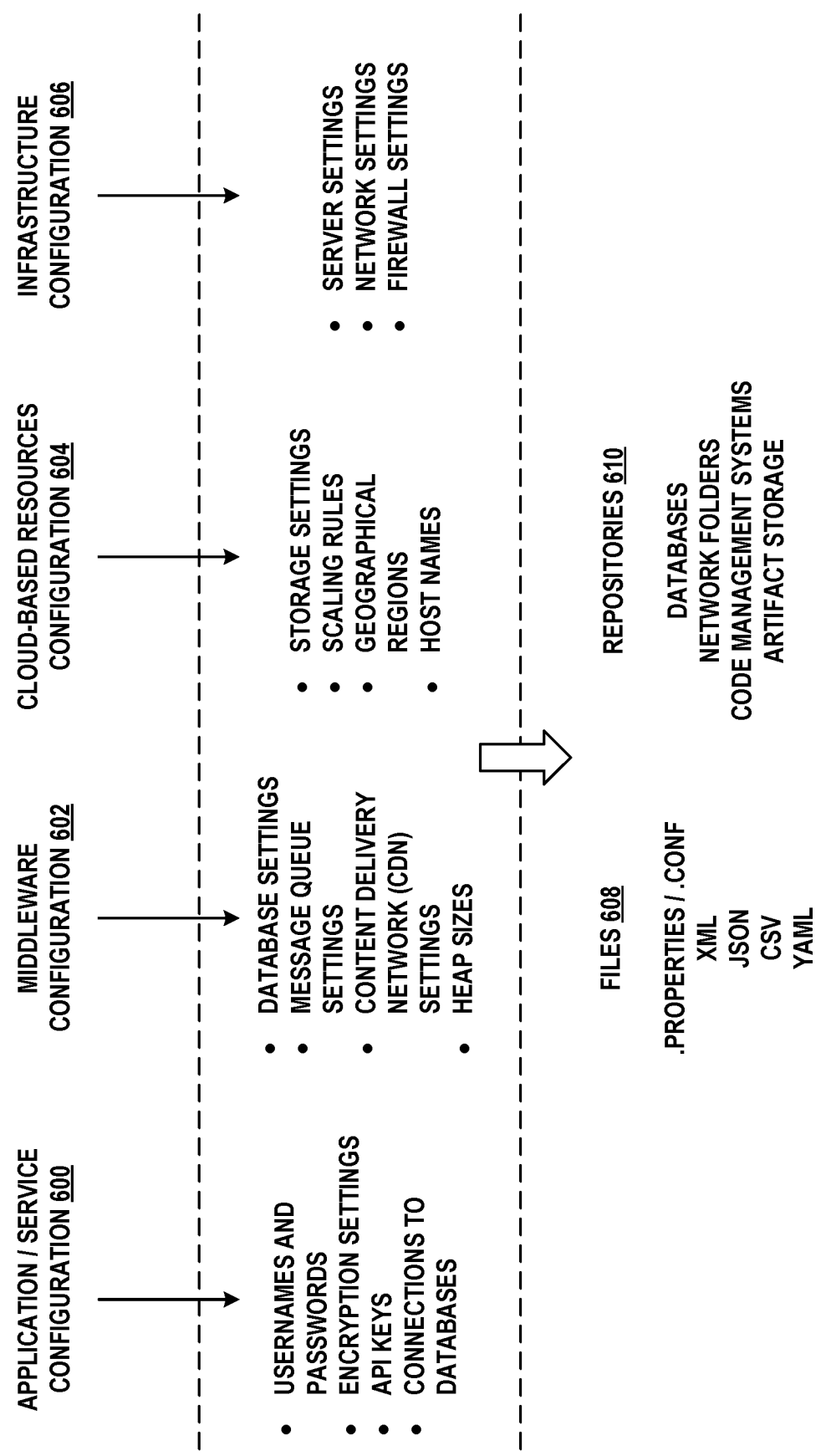
FIG. 6A provides types of configuration data, how the configuration data is stored, and where the configuration data can be stored, in accordance with example embodiments.

FIG. 6A illustrates an example of types of configuration data, as well as how and where it might be stored. Application/service configuration 600 may include configuration data for specific software applications and/or services. These may be one or more of usernames and passwords, encryption settings, application programming interface (API) keys, or connections to databases. Middleware configuration 602 may include configuration data of features built into the remote network management platform that may be employed by the software applications and/or services. These may be one or more of database settings, message queue settings, content delivery network (CDN) settings, and/or heap sizes. Cloud-based resources configuration 604 may include configuration data relating to one or more public cloud network services used by the software applications and/or services. These may be one or more of storage settings, scaling rules (e.g., for processing, storage, and network capacity), geographical regions in which the cloud-based resources are located, and/or host names relating to these resources. Infrastructure configuration 606 may include configuration data directed to the operation of computing devices within the remote network management platform. These may be one or more of server device settings, network settings, firewall settings, and so on. For instance, these settings may include IP address assignments, domain name assignments, workgroup assignments, etc.

This configuration data may be stored in different ways spread across the remote network management platform, one or more public cloud networks, and/or other locations. For example, some of this configuration data may be stored in files 608, which may include unstructured text, structured text, or be other types of files—e.g., .properties, .conf, XML, JavaScript Object Notation (JSON), comma-separated-value (CSV), and/or Yet Another Markup Language (YAML) files. Alternatively, or additionally, some of this configuration data (parameters and/or files) may be stored in repositories 610, which may include databases (e.g., specific database tables), network folders, source code management systems, and/or artifact storage.

In some cases, configuration data may be stored in a hierarchical tree-like structure. For instance, JSON and XML files are hierarchically structured in a fashion that is directly analogous to a node tree. In these types of files, objects are either an element (e.g., a key-value pair that is like a leaf of a tree) or a container of other objects (e.g., a block of elements that is like a root or intermediate node in a tree).

As a concrete example, an airline booking web site can contain many nodes of application and service configuration data, such as a custom ticket reservation application, a user relations management component, a transaction gateway service, a user interface, a series of webservers that provide content to the user interface, authentication microservices, database servers, load balancers, and internal network routing policies that all need to be configured properly in order to combine and operate seamlessly as the airline booking application service. As such, the configuration data of a software service may be extensive and number in the thousands of nodes storing tens of thousands of configuration key-value pairs in a tree-like hierarchy. A simplified example set of JSON configuration for such a software service is shown in FIG. 6B.

The challenges of maintaining such configuration data are not only that the data is complex (tens of thousands to millions of parameters), but also that changes to it are frequent (multiple changes on daily basis). For example, a remote network management platform may support hundreds or thousands of software applications and services, some fraction of which may be under continuous development processes, such as various types of agile programming models. As such, new versions of these applications may be deployed into a production environment every few days, or even several times in one day.

The teams of software engineers developing and testing these applications may make changes to the configuration data of their applications, but may also modify that of other applications, as well as that of middleware and/or infrastructure. Thus, to fix a software defect or to deploy a few feature, one team of software engineers may make changes to configuration data that affects the software applications of some or all other teams. Such changes may cause at least some of these other software applications to change behavior or to fail in various ways.

Further, each set of configuration data may be placed in files 608 and/or repositories 610 that are disposed throughout numerous locations. This leads to weak access restrictions for configuration data and the coordination of changes being difficult if not impossible. The result is that changes can be uncontrolled, can have no traceability, and cannot be easily audited.

As a consequence, a major root cause of software application and service outages is now errors in configuration data. In some estimates, these errors are even more prevalent and more impactful than coding errors in the software applications. Some notable configuration-related outages have taken entire web sites offline or rendered them impractical to use for hours or even days. Due to the aforementioned limitations, these outages are difficult to troubleshoot because narrowing down the configuration changes among hundreds and thousands of key-value pairs that may have caused the outage is akin to looking for a needle in a haystack across multiple files and repositories.

Therefore, any improvement in how configuration data is managed, presented, viewed, and manipulated such that outages are less likely to occur and faster to resolve would be beneficial.

The embodiments herein provide such improvements. As shown in FIG. 6C, the embodiments may involve consolidating the configuration data into a centralized configuration data model 612, which may be stored in a single location. This facilitates centralized visibility into configuration data (so that software engineers and operations engineers do not have to spend inordinate amounts of time just to find relevant files or repositories). This also facilitates role-based access control, in which sets of access control lists (ACLs) or other mechanisms define which users can make what changes to certain parameters at what points in time. This further facilitates continuous validation in which automated processes scan the configuration data to identify possible errors, misconfigurations, or inconsistent groups of parameters. Such validation may be based on rules that define valid and/or invalid parameters or combinations of parameters, or based on logic that is more complex.

One or more such ACLs may also control the visibility to nodes, keys, or values on a per-user or per-user-group basis. As a result, some users may be unable to view certain branches in the tree, or to observe certain masked values (like passwords) while still maintaining the ability to know that the masked value was added, edited, deleted, or remains unchanged.

A version of the configuration data may be referred to as a snapshot. Modifications to the configuration data may be gated by change requests, where these change requests specify the files, database entries, and/or other structures impacted by each change. This allows a timeline of changes to be generated from the snapshots, and differences between the parameters of the snapshots to be determined based on the change requests. Such differences may be displayed in a tree-like hierarchy with additions, deletions, and modifications (edits) from one snapshot to another clearly indicated. Sets of such differences are referred to herein as changesets and may be associated with change requests. Advantageously, configuration faults can be quickly identified and triaged without having to examine thousands of parameters in numerous locations.

As noted above, snapshots refer to versions of the configuration data. In some cases, a snapshot may refer to the entirety of the configuration data, and in others only a subset of the configuration data (e.g., the part of the configuration data used by one or more specific software applications).

As an example, suppose that a particular software application includes parameters in the configuration data that determine which search engine is to be employed for user search requests. It may be desirable to support multiple search engines and have the software application be able to use or switch between any of them.

In possible embodiments, the parameters may be updated to include a new search engine. For example, parameters to specify the Google search engine may include the following key-value pairs: "googleSearch: disabled", "googleSearchURL: www.google.com", and "googleRefIdNumber: grefID123113".

First, a change request may be made, asking for the new search engine to be added. This change request may come from a user or an application, and may be added to a database of change requests stored by the remote network management platform. Based on this change request, a software developer may add the new parameters to a configuration file of the software application. Next, a new version of the software application is built, incorporating these parameters into its configuration file, as well as any changes to the code of the software application that facilitates use of the new search engine. Then, the package (e.g., the new versions of application and its configuration data) may undergo automated testing procedures. Such testing may involve making sure that the configuration file is syntactically correct and properly formatted.

Assuming that these tests pass, the configuration file may be uploaded to centralized configuration data model 612. A snapshot of the configuration file is made, where the snapshot is the current version of the configuration file. The snapshot goes through a validation process and is then published (made available) by way of a web interface of centralized configuration data model 612.

After the snapshot is available, a change control process is undertaken to review and either approve or reject the change request (as well as the associated changeset and snapshot). The change control process may include manual review from a software developer or automated review. For example, the results of the validation process may be reviewed to ensure that validation was successful. Once the change request is approved, the package can be deployed into an environment (e.g., production use by end users of the remote network management platform, testing use by software testers, or development use by software developers).

VII. Using Shared Components

As noted above, configuration data may be made up of sets of parameters, where a parameter may be a key-value pair, one or more alphanumeric values, references to files, or some other type of content. Some further examples of types of configuration data and where the configuration data may be stored are illustrated in FIG. 6A. In the present disclosure, sets of one or more configuration data parameters are referred to as "components."

As noted above, each application or service supported by the remote network management platform may have its own configuration data. While some of this configuration data is specific to the application, some components of the configuration data may overlap and contain the same information, for instance containing configuration data parameters relating to the same database, SQL server, or any other software application or service within the remote network management platform. Components containing duplicate configuration data can lead to the wastage of limited compute or data storage resources, cause inefficiencies and data errors during copying of the components, as well as other drawbacks. As also noted above, configuration data errors are now the leading cause of system outages and are difficult to troubleshoot due to the fractured nature of the configuration data over many services.

Therefore, an improvement in how configuration data is stored and shared among applications and services such that errors and outages are less likely to occur and faster to resolve would be beneficial. The embodiments herein provide such improvements. These embodiments may involve introducing the concept of a shared library of configuration data, which in some embodiments may comprise shared components. Such shared components allow the configuration data for applications or services (such as the aforementioned database or SQL server) to be held in common among the different applications that make use of them, avoiding the resource wastage and error-prone processes of multiple applications having their own duplicate copies of the configuration data.

Figure 7A:
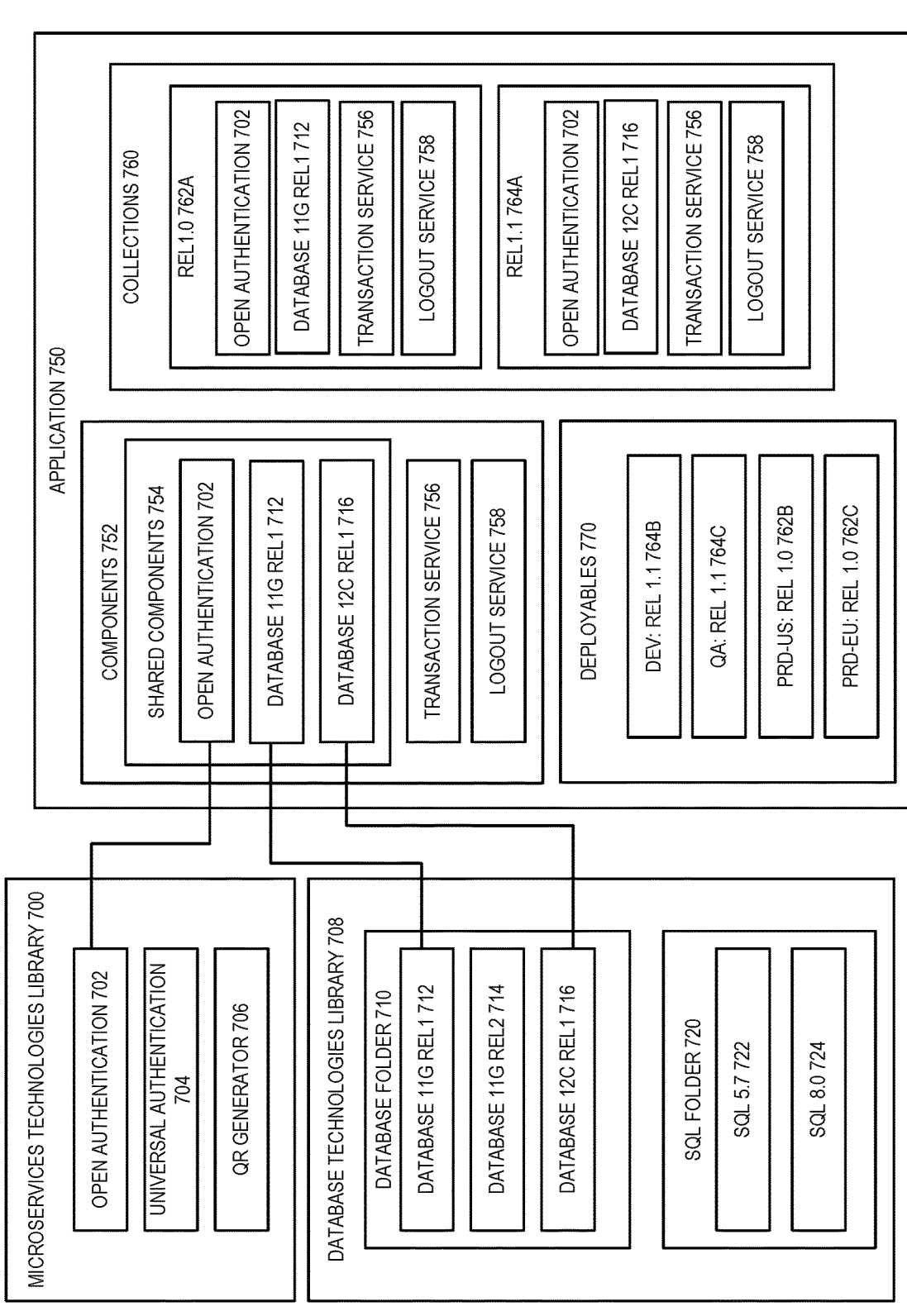
FIG. 7A illustrates a high-level overview of the relationship between shared components in a shared library and the applications and services that include the shared components, in accordance with example embodiments.

FIG. 7A provides a high-level overview of the connection between an application 750 and the shared libraries 700, 708 that it depends on for shared components. Shared libraries offer a convenient way to group related shared components that may have similar use-cases in different applications.

The microservices technologies shared library 700 comprises three components of configuration data: open authentication 702, universal authentication 704, and quick-response (QR) generator 706. Each component contains its own configuration data parameters associated with its use case.

Some embodiments may additionally allow for the creation of folders within shared libraries to further group and organize related shared components. For example, FIG. 7A depicts the database technologies library 708 containing two folders: database folder 710 and SQL folder 720. The database folder 710 comprises three components: Database 11G Release 1 712, Database 11G Release 2 714, and Database 12C Release 1 716, while the SQL folder 720 comprises SQL 5.7 722 and SQL 8.0 724.

In some embodiments, shared components may be further grouped into collections and deployables. A collection is another manner of organizing configuration data components, whether shared or non-shared, within an application in a similar manner to how a folder may be used to organize components within a shared library.

A deployable is a specific version of an application that may be deployed for a specific use case. In some embodiments, this may be used for version control, as also depicted in FIG. 7A. For instance, the development (dev) deployable Release 1.1 764B represents a newer version of the application, and may include a newer version of the database (12C Release 1 716) than the United States production deployable Release 1.0 762B which includes an older version of the database (e.g. 11G Release 1 712). Other deployables 770 within the application may include different shared components reflecting different versions for different channels within the software development process (e.g. production, testing, different localizations, etc.). For example, a European Union production deployable 762C may be included, as may a quality assurance deployable 764C.

Figure 7B:
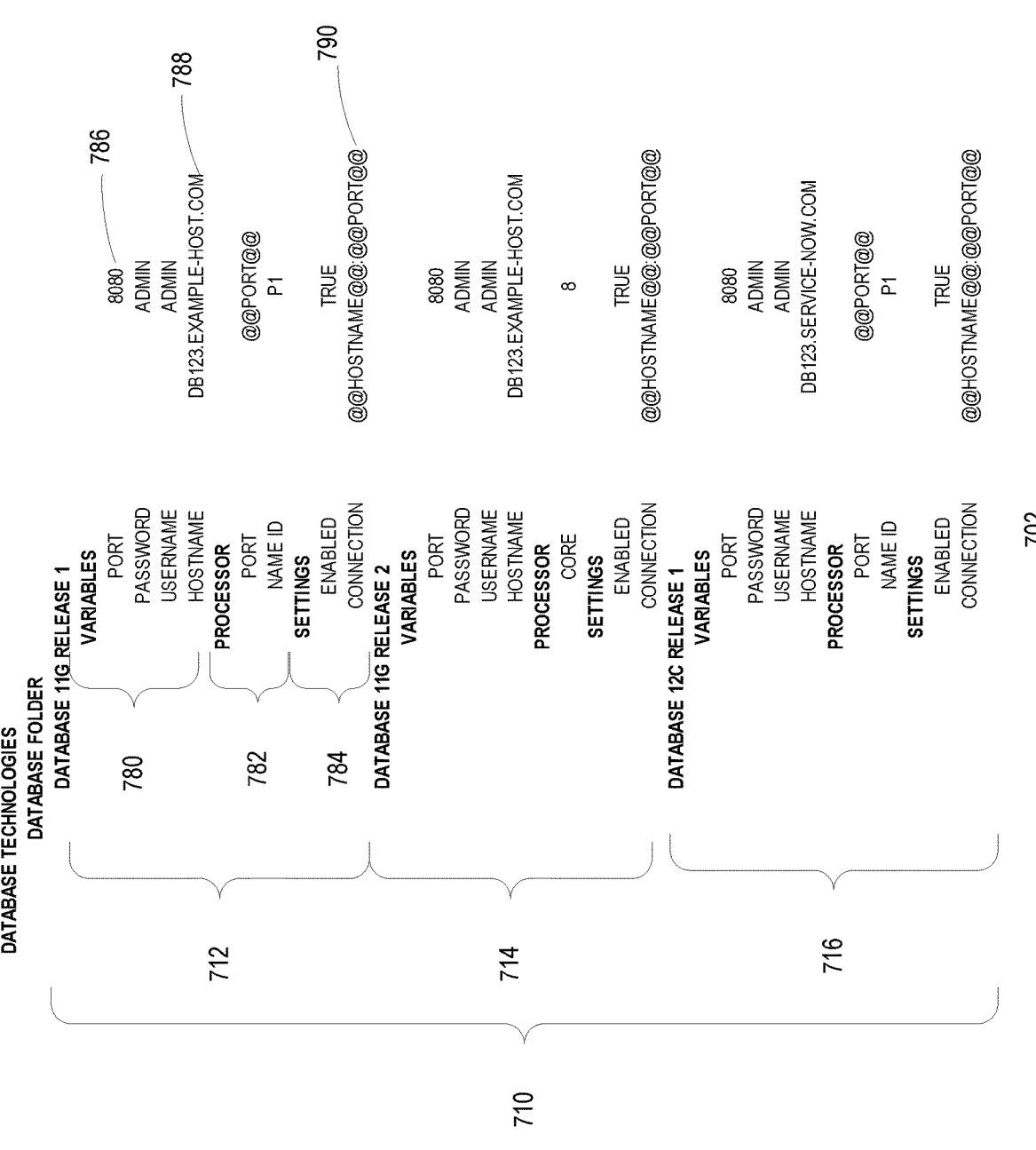
FIG. 7B illustrates configuration data entries that may be included in a shared library that contains several shared components, in accordance with example embodiments.
Figure 7C:
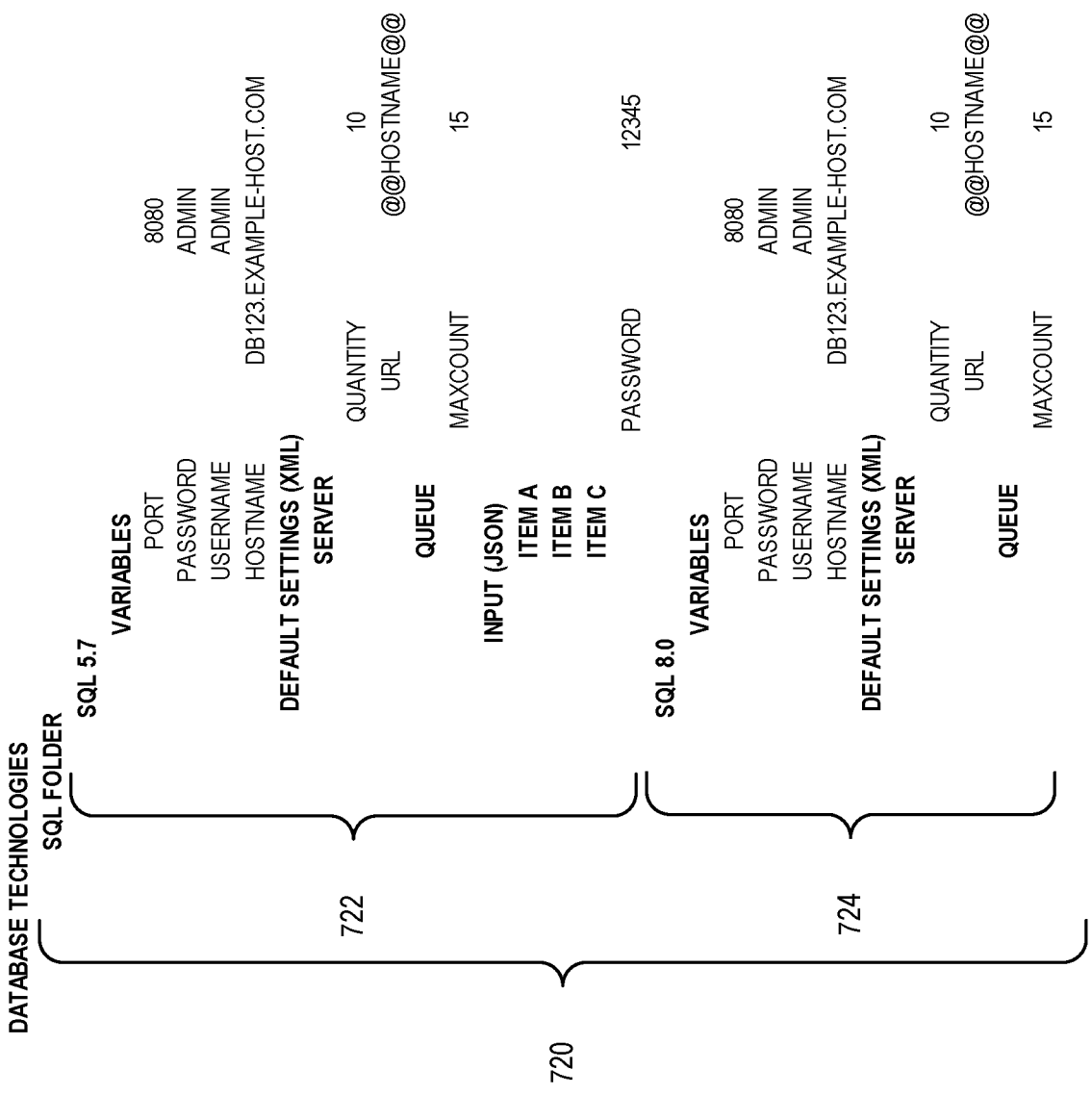
FIG. 7C illustrates configuration data entries that may be included in a shared library that contains several shared components, in accordance with example embodiments.
Figure 7D:
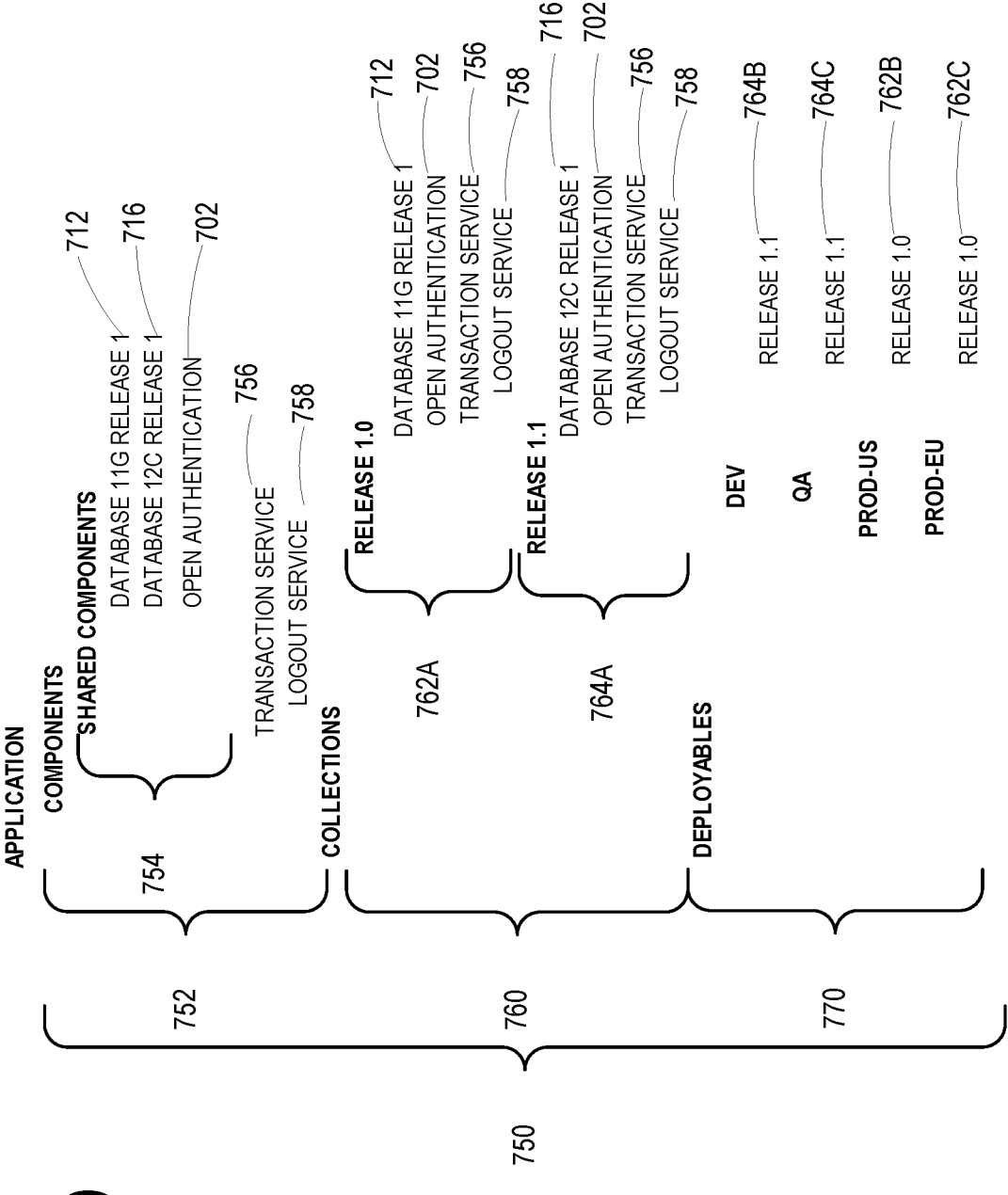
FIG. 7D illustrates configuration data entries for an application that includes several shared and non-shared components, in accordance with example embodiments.

FIGS. 7B-7D provide specific examples of configuration data parameters that may be contained within shared components. FIG. 7B depicts the database folder 710 within the database technologies shared library 708 with specific configuration data parameters provided as examples. For instance, under the Database 11G Release 1 shared component 712, several configuration data parameters are listed. In some embodiments, some of the configuration data items included may be the network port, hostname, and authentication credentials needed to access that specific component. Instead of being duplicated within the configuration for the application, the application can include the shared component to utilize its functionality and its configuration data.

Additionally, as also illustrated in FIG. 7B, configuration data parameters may refer to other configuration data parameters within the same component, further reducing the need for duplication. For example, within the Database 11G Release 1 shared component 712, under the SETTINGS folder 784, the CONNECTION configuration data parameter 790 refers to both the HOSTNAME parameter 788 and the PORT parameter 786 by way of surrounding the name of the parameter in question with the "@@" text callout, which signals to a reference to the parameter within the same component that has the same name.

The purpose of these text callouts is to reduce the number of changes when updating configuration data parameters within a component. Without these configuration data text callouts, updating all versions of the PORT configuration data parameter within the Database 11G Release 1 shared component 712, would require changing the configuration data parameter three times: once in the PORT configuration data parameter in both the VARIABLES folder 780 and the PROCESSOR folder 782 as well as in CONNECTION parameter 790 within the SETTINGS folder 784. However, with the text callout, only the PORT configuration data parameter 786 would need to be updated, as the CDM would automatically update the other occurrences in the component with the new value of only the PORT configuration data parameter 786.

FIG. 7C depicts another folder within the database technologies shared library 708, specifically the SQL folder 720 with specific configuration data parameters provided as examples. For instance, under the SQL shared component 722, several configuration data items are listed. In some embodiments, including that illustrated by FIG. 7C, some of the configuration data items included may be the network port, hostname, and authentication credentials needed to access that specific component, as well as other configuration data entries that may be in the form of XML data (as in the 'default settings' configuration data parameters) or JSON data (as in the 'input' configuration data entries). In other words, multiple formats of configuration data parameters may be present in the same component.

While FIG. 7C contains different examples of configuration data, it may be used in a similar way as FIG. 7B as it is simply another folder within the database technologies shared library 708. Additionally, as in FIG. 7B, FIG. 7C also depicts the use of the "@@" text callout to allow configuration data parameters to refer to other configuration data parameters within the same component.

FIG. 7D depicts the inclusion of several components, including shared components, into an example application 750. This application 750 imports the Database 11G Release 1 shared component 712, among others, from the database technologies shared library 708 depicted in FIGS. 7A and 7B. The included shared components are listened under the "shared components" folder 754 within the application components listing 752. In the example embodiment depicted, the included shared components are two versions of a database, specifically Database11G Release 1 712 and Database 12C Release 1 716, and Open Authentication component 702 from the microservices technologies library 700. These shared components can then be used throughout the application and included in different collections or deployables. In some embodiments, non-shared components may be, as an example, a transaction service 756 or logout service 758, as also depicted in FIGS. 7A and 7D. Together, these components make up all the components within the application components listing 752 included within the application 750.

As stated previously, collections in some embodiments may be useful for version control. A specific collection may be assigned to a deployable, such that when the deployable is deployed the configuration data for the specific software version needed is included as well.

This is also depicted in FIG. 7D, with Release 1.0 762 of the application containing the shared components Database 11G Release 1 712 and Open Authentication 702, as well as the non-shared components transaction service 756 and logout service 758. FIG. 7D also depicts Release 1.1 764 of the application includes Database 12C Release 1 716 as well as Open Authentication 702, transaction service 756, and logout service 758.

Thus, FIG. 7D additionally provides more specific examples of the functionality depicted in FIG. 7A with the collections in use for version control, as Database 11G Release 1 712 and Database 12C Release 1 716 are both distinct components providing configuration data for different versions of a database. Each component may be included in different collections and different deployables.

In other embodiments, deployables included in the deployables listing 770 may be specifically labeled versions of specific collections 760 for specific use cases. For example, FIG. 7D depicts the DEV ("development") deployable 764B and QA ("quality assurance") deployable 764C within the deployables listing 770, each of which is a relabeled version of Release 1.1 764A. Additionally, the deployables listing 770 is illustrated as including the PRD-US ("production, United States") deployable 762B and PRD-EU ("production, European Union") deployables 762C, each of which is a relabeled version of Release 1.0 762A. Each may represent a different packaging or stage within the software development process of the application, as well as configuration data reflecting different regional requirements or regulations.

While FIGS. 7B, 7C, and 7D depict the configuration data entries in a human-readable table format, the configuration data may in some embodiments be structured in the JSON (using key-value pairs as in FIG. 6B) or XML file format, any other useful file format or data structure for storing structured data, or any combination thereof.

In order to implement shared libraries and shared components, the configuration data model (CDM) 612 may contain certain information that links shared libraries, shared components, and applications and services together.

Figure 8A:
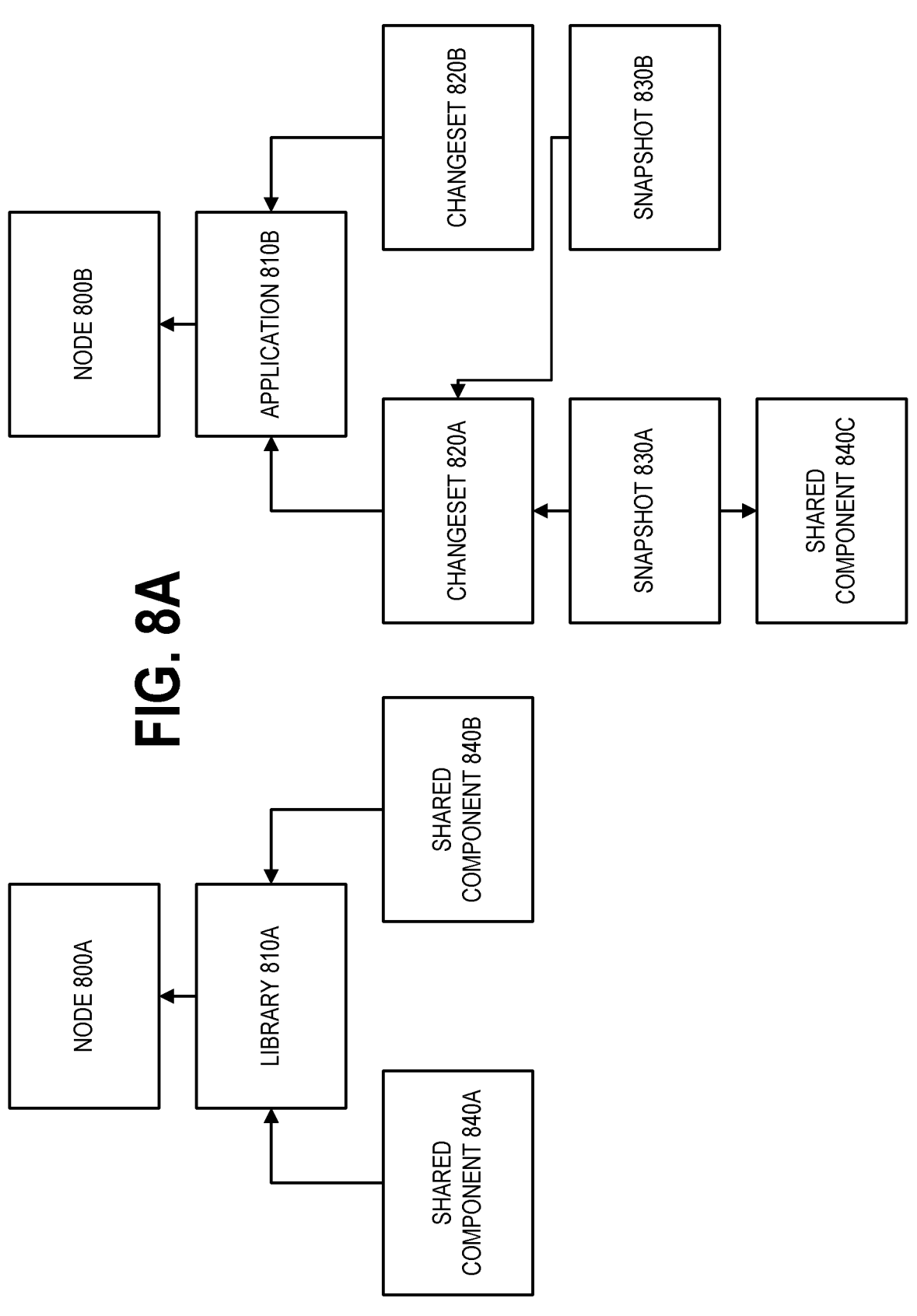
FIG. 8A depicts a high-level overview of the configuration data model (CDM) that stores configuration data and implements shared components, in accordance with example embodiments.
Figure 8B:
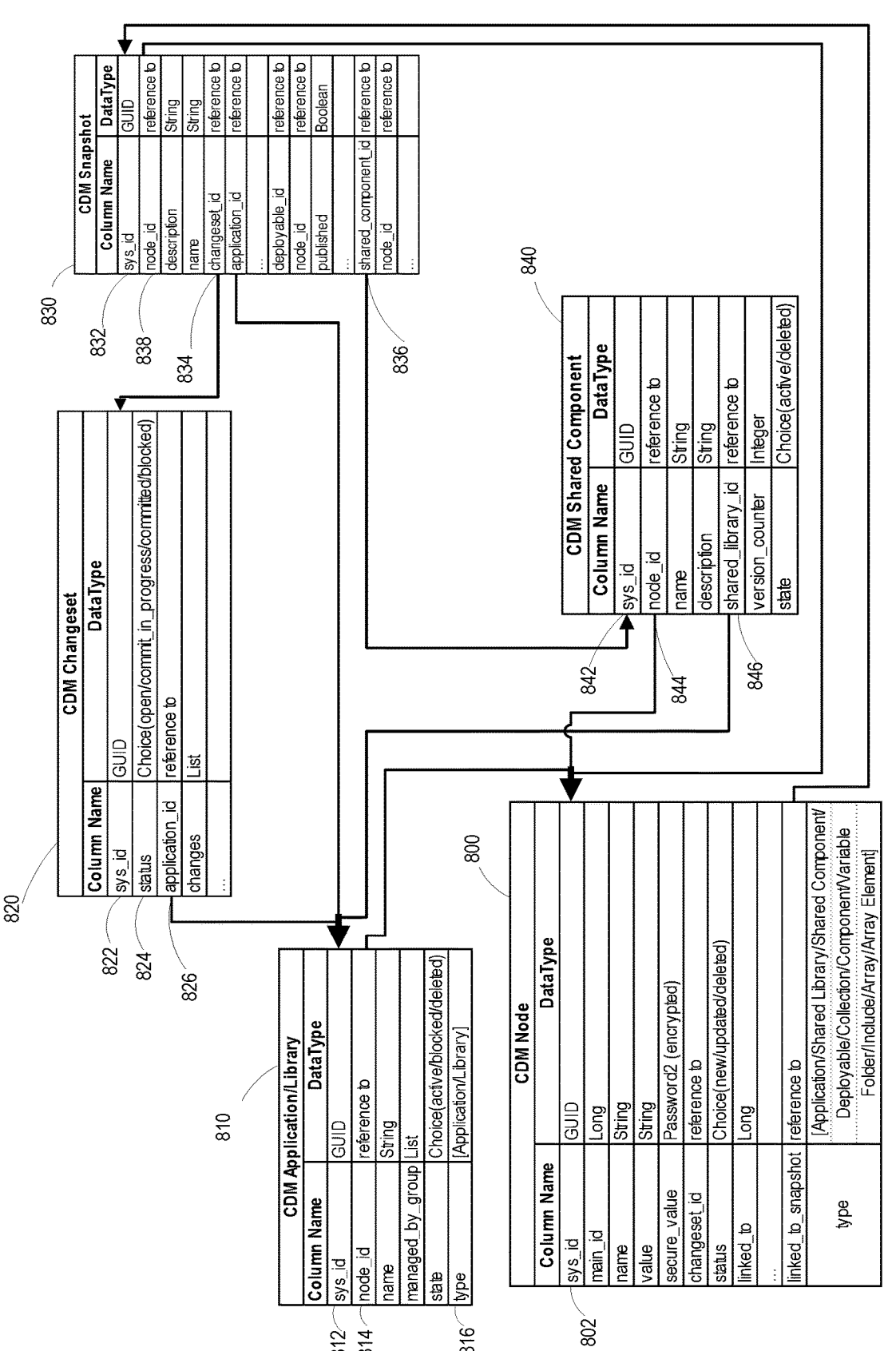
FIG. 8B depicts examples of the records that comprise the CDM, in accordance with example embodiments.

To that end, FIGS. 8A and 8B depict how shared components are implemented in the broader scope of the CDM 612. Each record illustrated may provide metadata for a specific portion of the CDM, which contains values relevant to entities like applications, configuration data libraries, configuration data components, and others. The CDM may contain multiple tables each containing a plurality of records.

Herein, a "table" may refer to a database table, for example a SQL database table, but in some embodiments may be any kind of data structure usable for storing tabular data. A "record" may refer to an entry in a table containing information referring to a specific node, application, library, changeset, snapshot, shared component, or any other element of configuration data within the CDM. Additionally, a "sys_id" may be a form of unique identifier for records within a particular table. In some cases, a "sys_id" may be a globally unique identifier (GUID) for all records across multiple tables of a computational instance.

In FIGS. 8A and 8B, the arrows represent the ability for a record in one table to refer to a record in another table.

FIG. 8A provides a high-level overview of the relationships between records within the CDM. Each rectangle represents a specific record representing information regarding a given node, application, library, changeset, snapshot, or shared component, which in some embodiments may contain information according to the corresponding schema illustrated in FIG. 8B.

A node is the foundational element of the CDM, as all other records within the CDM refer back to a node in some manner, whether directly through a sys_id or indirectly through another record.

A node record 800A may contain information according to a schema for node record 800 illustrated in FIG. 8B. A schema in this case refers to an example of the information that may be included within a specific record. A record, as described above, may refer to an entry in a table containing information referring to a specific node, application, library, changeset, snapshot, shared component, or any other element of configuration data within the CDM. Thus, a schema may represent one example of such information included in a record. However, the schemas illustrated herein are only examples of possible schemas, as the CDM may in some embodiments contain a plurality of records according to the illustrated schemas and/or records according to other schemas not illustrated.

Node record 800A may represent the foundational element within the CDM for a shared library record 810A. The shared library record 810A may contain information according to the schema for application/library record 810 illustrated in FIG. 8B. Shared library record 810A may refer to the sys_id of node record 800A, linking the two records.

Shared library record 810A, as in the example illustrated, may include shared components. Each of shared component records 840A and 840B may refer to the sys_id of shared library record 810A.

A node record 800B may also contain information according to the schema for node record 800 illustrated in FIG. 8B. Node record 800A may represent the foundational element within the CDM for an application record 810B. This application record 810B may contain information according to the schema for application/library record 810 illustrated in FIG. 8B. To that end, application record 810B may refer to the sys_id of node record 800B, linking the two records.

Application record 810B may be associated with a changeset. A changeset refers to edits made to configuration data parameters and configuration data components as part of a change request (described above). Thus, changeset record 820A and changeset record 820B may both refer to the sys_id of application record 810B.

Changesets may also include snapshots. As described above, snapshots are stored versions of the configuration data, and may be associated with a change request. Snapshots may be represented in the CDM as records according to the schema for snapshot record 830 as illustrated in FIG. 8B. Two snapshot records are illustrated in FIG. 8A as snapshot record 830A and snapshot record 830B. These snapshots' association with a change request (and thus changeset) may be represented in the CDM by snapshot record 830A and snapshot record 830B each referring to the sys_id of changeset record 820A.

As noted above, snapshots may contain stored versions of configuration data, and thus may include shared components. This inclusion may be represented in the CDM as shared component record 840C referring to the sys_id of snapshot record 830A.

FIG. 8B illustrates specific examples of information that may be included in records within the CDM. Additionally, the illustrations in FIG. 8B represent a possible schema for records representing nodes, applications, libraries, changesets, snapshots, and shared components. However, this is only a possible schema, as the CDM may in some embodiments contain a plurality of records according to the illustrated schema and/or records according to other schemas not illustrated.

In FIG. 8B, a large arrow with several lines converging on it represents an entry in the given record to which multiple other records refer. For example, application/library record 810, snapshot record 830, and shared component record 840 all refer to node record 800, and thus their connecting lines all converge at the arrow referencing the sys_id 802 of node record 800. Additionally, the ellipses ( . . . ) symbol within a record means that multiple entries of the above row(s) are allowed within the record. For example, snapshot record 830 may have multiple entries of changeset_id 834 and shared_component_id 836.

In FIG. 8B, a CDM node record 800 is illustrated. As noted above, a CDM node may represent a portion of data stored within the CDM, for example storing a record of the configuration data associated with an application or other component that depends on configuration data. A node may represent an application, a service, a deployable, a collection, a folder, a shared component, or any other part of the CDM. In some embodiments, the node record 800 may include a sys_id 802 to identify the node record 800 within the broader context of the CDM.

Other records within the CDM may provide further information, building upon the specific node record 800 and allowing for useful operations using the configuration data.

For instance, as illustrated in FIG. 8B, the application record 810 may include a sys_id 812 to identify the application record 810 within the broader context of the CDM. In some embodiments, the application record 810 may also include a node_id 814, a reference to the sys_id 802 of a related node record 800, linking the two records together. Additionally, the application record 810 may provide a type 816 to specify whether the record concerns an application/service or a shared library. Further, this application record may be linked with other records in other CDM tables containing other related information.

A changeset record 820 may be implemented in some embodiments. The changeset record 820 may include a sys_id 822 to identify the changeset record 820 within the broader context of the CDM. A changeset refers to edits made to configuration data parameters and configuration data components as part of a change request (described above). Once a change request is made, the changeset record status 824 would be set to "open." If a change request is approved, its status 824 may change to "commit in progress," then to "committed" or "blocked" depending on the result of the changeset process. A successful change made would result in the status 824 becoming "committed." If a particular configuration data item is locked and unable to be edited, or there is a conflict with another changeset, the changeset record status 824 may become "blocked." This status information is useful for tracking the changes made to configuration data.

A changeset record 820 may also include an application_id 826, a reference to the sys_id 812 of the application or library record 810 that the changeset is configured to edit. As stated above, a node record 800 may be linked with an application record 810 which is then further linked to a changeset record 820. An example of this linking of records is illustrated in FIG. 8A. Thus, when a changeset is processed, the information in the application record 810 and in the node record 800 may be updated.

A snapshot record 830 may also be implemented in some embodiments. As described above, snapshots refer to versions of the configuration data, and may be associated with a change request. In some cases, a snapshot may refer to the entirety of the configuration data, and in others only a subset of the configuration data (e.g., the part of the configuration data used by one or more specific software applications). The subset of the configuration data may include a shared library, a component, or any portion thereof. In some embodiments, the snapshot record 830 may include a sys_id 832 to identify the snapshot record 830 within the broader context of the CDM.

A snapshot record 830 may be associated with one or more changeset records 820 within changeset table 820. Each changeset record 820 may contain a store of the configuration data that is intended to be edited if a change request is approved. To facilitate this association, a snapshot record 830 may include a changeset_id 834, which refers to the sys_id 822 of the associated changeset record 820 within the CDM.

A snapshot record 830 may also be associated with a specific shared component. This association may be facilitated by the snapshot record 830 including a shared_component_id 836, which refers to the sys_id 842 of a shared component record 840 within the CDM.

While snapshots may be associated with one or more changesets, this is not a requirement for their function. Some snapshots may exist independently within the CDM, for example as a backup of configuration data or a temporary storage of configuration data intended to be used in a yet-to-be-implemented application or service. For a snapshot record that exists independently of a changeset, the snapshot record 830 may include a node_id 838, referring to the sys_id 802 of its related node record 800 within the CDM.

In some embodiments, a shared component record 840 may also be implemented. The shared component record 840 may include a sys_id 842 to identify the shared component record 840 within the broader context of the CDM. Shared components may be linked to a specific snapshot as described above, or exist independently within the CDM, for example as a component that has not been yet included in a shared library or application. For shared components that exist independently within the CDM, the shared component record 840 may include a node_id 844, referring to the sys_id 802 of its related node record 800 within the CDM.

For shared components that are included in a shared library, the shared component record 840 may include a shared_library_id 846, referring to the sys_id 812 of the library record 810 it is included in. For example, when a change request including an operation to include a component into a shared library is processed, the shared component record 840 will have its shared_library_id 846 updated to reflect the change.

FIGS. 7A-8B represent possible arrangements for a configuration data model and other systems that enable the usage of shared components. The following sections will describe from a user perspective how shared components may be created, updated, and used within a more general context and within that of a user interface.

Figure 9:
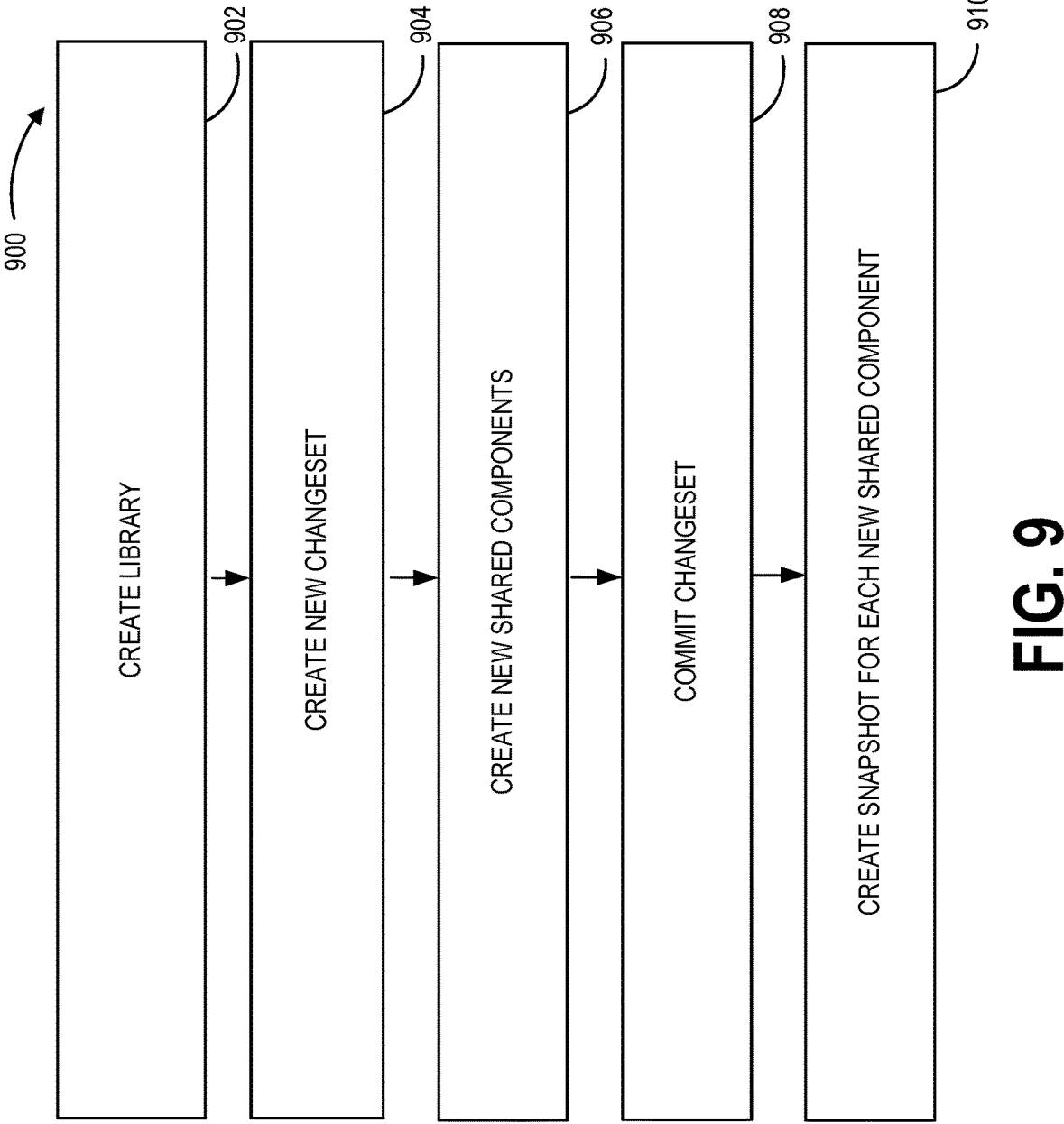
FIG. 9 depicts a workflow for creating a shared library comprising one or more shared components, in accordance with example embodiments.

FIG. 9 depicts a workflow 900 for creating a new shared library containing one or more shared components. The workflow may be performed by a user, who may be a regular user (without elevated privileges) or an administrator (with elevated privileges). If the workflow is performed by a user without elevated privileges, an administrator may need to approve a step to prevent unauthorized changes to the CDM.

A user may create a new shared library to group together related components that are used in multiple different applications. By including them in a shared library rather than duplicating them for each application, the overall system has its memory usage reduced.

Block 902 may involve creating the new library. In some embodiments, the new library may be represented within the CDM in the form of an application/library record 810 as illustrated in FIG. 8B. Additionally, the application/library record 810 may also be linked to a node record 800 by way of node_id 814 referencing sys_id 802. This creation step may involve making the above record-linking changes to the CDM, creating a new node and associated shared library if necessary (i.e. not overwriting a previous library or application with the new library).

Block 904 may involve creating a new changeset, defined above as the edits made to configuration data reflecting the new shared library. In some embodiments, these changes may reflect the structure of configuration data depicted in FIGS. 7B and 7C. The new changeset may be represented within the CDM in the form of a changeset record 820 as illustrated in FIG. 8B. The changeset may include the new shared library by way of editing the application_id 826 of changeset record 820 to reference the sys_id 812 of application/library record 810.

Block 906 may involve creating new shared components and including the shared components into the relevant application or service by listing the shared components within the appropriate configuration data attribute of the relevant application or service, as depicted in FIG. 7D. The new shared components may be represented within the CDM in the form of one or more shared component records 840 as illustrated in FIG. 8B. One or more fields within the new shared component records 840 may be updated, for example node_id 844 referring to the sys_id 802 of the associated node record 800.

The inclusion of one or more shared components into an application may occur by way of including edits to the shared component records 840 and application/library record 810. In some embodiments, these edits may involve editing the shared_library_id 846 of the shared component records 840 to reference the sys_id 812 of the associated application/library record 810.

Block 908 may involve committing the changeset for approval and, in some embodiments, submitting the associated change request as well. Upon approval, the changes may either be written to a database within the remote network management platform or rejected depending on the logic flow in FIG. 11.

Block 910 may involve, in response to the determining which shared components have been newly-created, creating a snapshot of each of the new shared components and storing the snapshot within the CDM. In some embodiments, this step may involve creating a new snapshot record 830.

In order to link the new snapshot record 830 to the operations performed above, the changeset_id 834 of the snapshot record 830 may be edited to reference the sys_id 822 of the changeset record 820. Additionally, a shared-_component_id 836 of the snapshot record 830 may be edited to reference the sys_id 842 of shared component record 840. The snapshot record 830 may include multiple shared_component_id values to accommodate a snapshot of multiple shared components.

Figure 10:
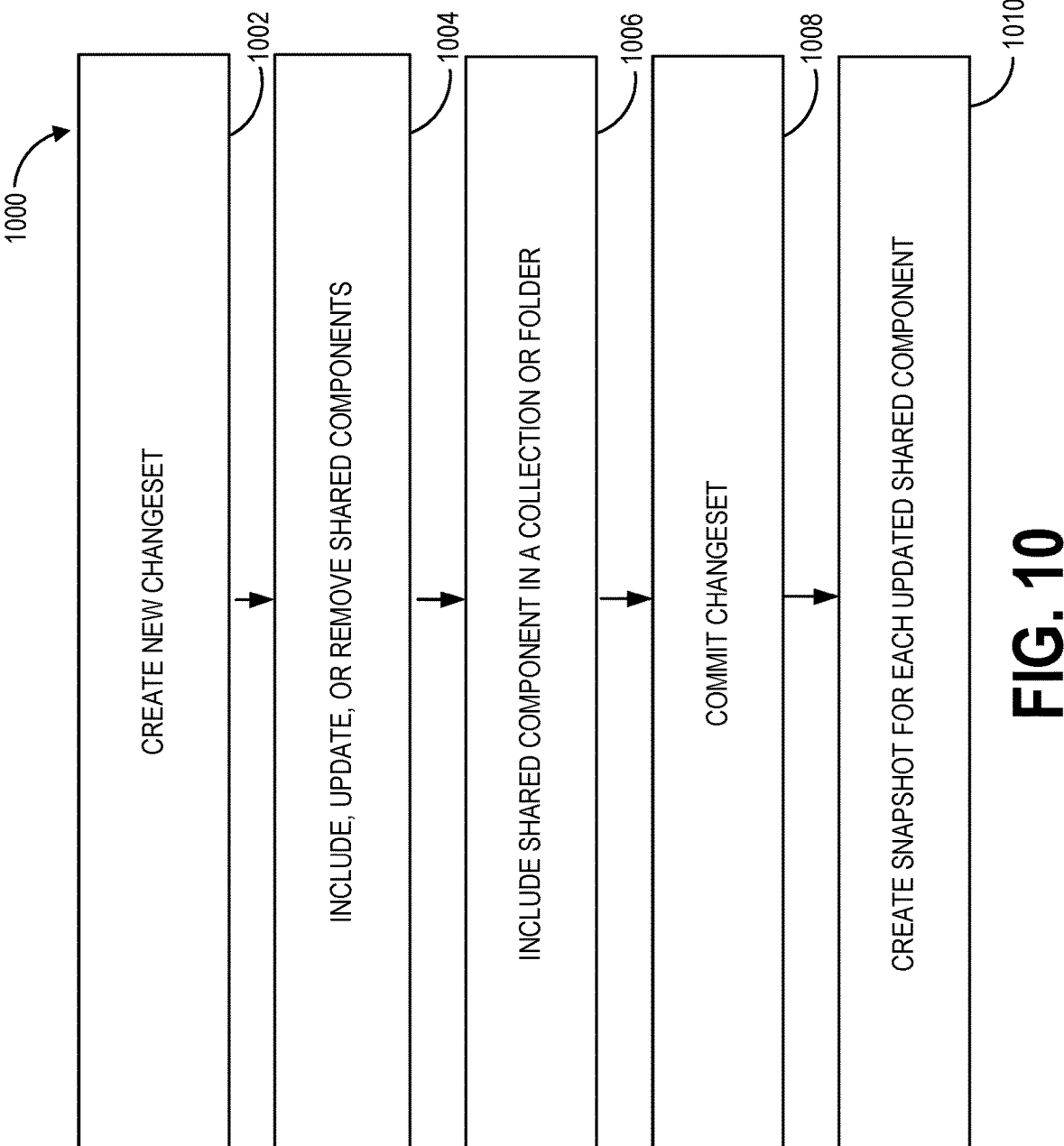
FIG. 10 depicts a workflow for requesting a shared component be made available as part of a shared library, in accordance with example embodiments.

FIG. 10 depicts a workflow 1000 for updating shared components within a shared library and organizing the shared components into a collection. The workflow may be performed by a user, who may be a regular user (without elevated privileges) or an administrator (with elevated privileges). If the workflow is performed by a user without elevated privileges, an administrator may need to approve a step to prevent unauthorized changes to the CDM.

A user may update the shared components within a shared library if a new version of a service whose configuration data is included in the shared component becomes available. For example, a user may wish to update SQL version 6.7 to SQL version 6.8 and provide access to the new features included in the new SQL version to the applications that may include components from the shared library.

Block 1002 may involve creating a new changeset, defined above as the edits made to configuration data. In some embodiments, these changes may reflect the structure of configuration data depicted in FIGS. 7B and 7C. The new changeset may be represented within the CDM in the form of a changeset record 820 as illustrated in FIG. 8B. The changeset may reference a shared library by way of editing the application_id 826 of changeset record 820 to reference the sys_id 812 of application/library record 810.

Block 1004 may involve including the shared components in a shared library or application, update an existing shared component's properties, or to delete a shared component entirely.

The inclusion may take place by updating the specified shared component record 840 by editing the shared library_id 846 to reference the sys_id 812 of the desired application/library record 810. This inclusion step operates the same whether the inclusion is into an application or a library, as the two have the same structure within the CDM (the application/library record 810). A shared component record 840 may include multiple shared_library_id values to accommodate a shared component that is included within multiple shared libraries, a shared library and an application, or multiple applications.

The updating of an existing shared component's properties may also take place in this step. This may take place by updating the specified shared component record 840, for example updating its name, description, version number, or any other related information.

The removal of a shared component from a shared library may take place by updating the specified shared component record 840 and removing the shared library_id 846 value referencing the sys_id 812 of the application/library record 810 which refers to the shared library that the shared component is desired to be moved from.

Block 1006 may involve including a shared component within a collection or folder within an application or shared library. This may take place by updating the specified shared component record 840, for example by including a "collection" or "folder" value within the record that may be referenced during the display of the shared component within a shared library or application.

Block 1008 may involve committing the changeset for approval and, in some embodiments, submitting the associated change request as well. Upon approval, the changes will either be written to a CDM database for use within the remote network management platform or rejected depending on the logic flow in FIG. 11.

Block 1010 may involve, in response to determining which shared components have been updated, creating a snapshot of each of the updated shared components and storing the snapshot within the CDM database. In some embodiments, this step may involve creating a new snapshot record 830.

In order to link the new snapshot record 830 to the operations performed above, the changeset_id 834 of the snapshot record 830 may be edited to reference the sys_id 822 of the changeset record 820. Additionally, a shared_component_id 836 of the snapshot record 830 may be edited to reference the sys_id 842 of shared component record 840. The snapshot record 830 may include multiple shared_component_id values to accommodate a snapshot of multiple shared components.

Figure 11:
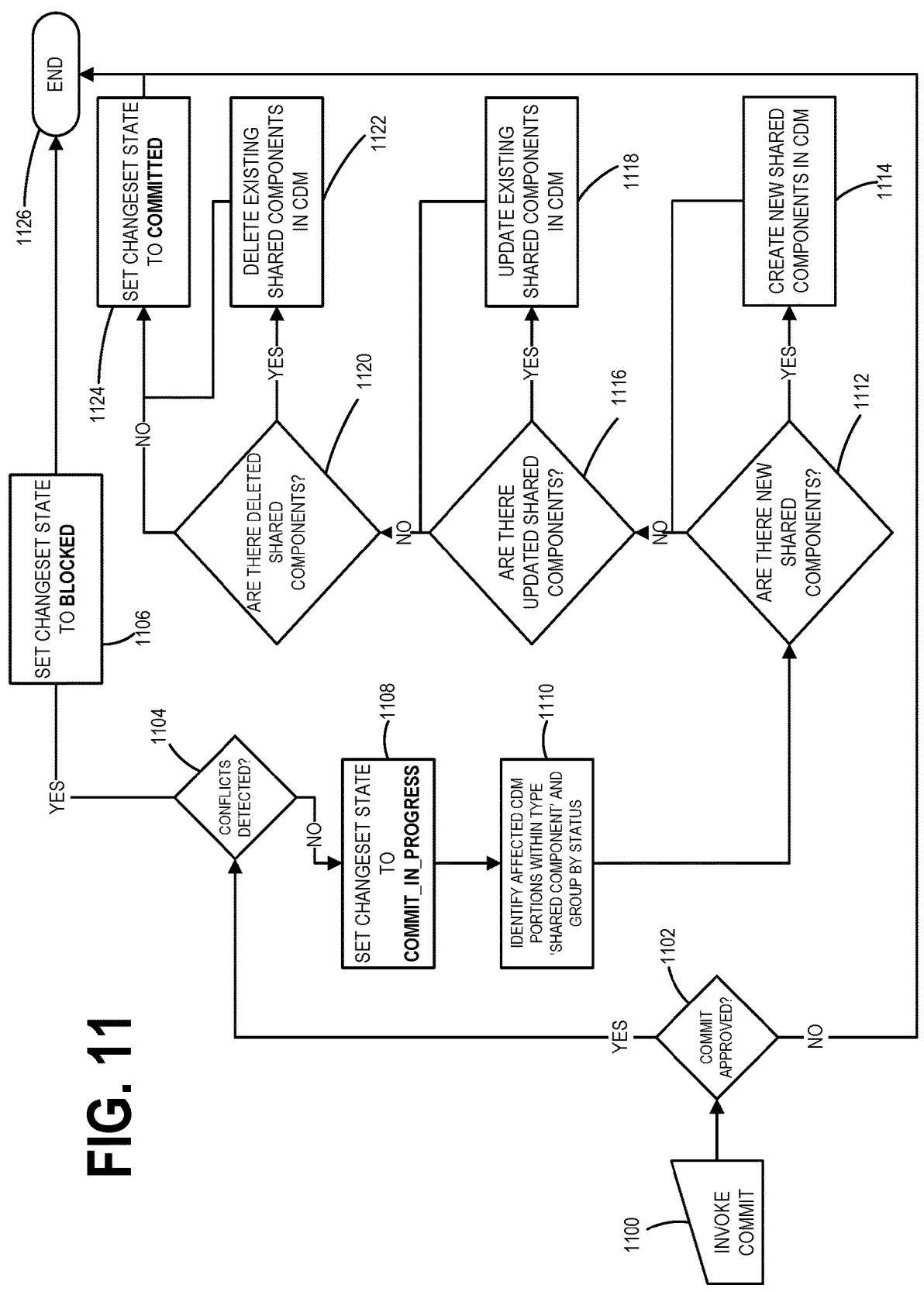
FIG. 11 depicts the logic performed by the CDM during the creation, update, or deletion of CDM nodes including functionality with shared components, in accordance with example embodiments.

FIG. 11 depicts a logic flow for commits of changesets that may create, update, or delete shared components. These actions may be performed when a change request is made by a user and reviewed by an administrator.

Block 1100 may involve invoke the commit process of the changeset, as referenced in FIGS. 9 and 10. The logic flow may then proceed to block 1102.

Block 1102 may involve checking for whether the commit of the changeset (and thus its associated change request) is approved by an administrator. If the commit is approved, the logic flow may proceed to block 1104. If the commit is not approved, the logic flow may proceed directly to the end state block 1126.

Block 1104 may involve checking the changeset for conflicts with another pending changeset, or if an affected application/library record 810 has a state set to 'blocked', preventing any changes until the state is changed. If a conflict is detected, the logic flow may proceed to block 1106. If no conflicts are detected, the logic flow may proceed to block 1108.

Block 1106 may involve changing the status 824 of changeset record 820 to "blocked," preventing any further changes until the conflict is resolved and the status removed. The logic flow may then proceed to the end state block 1126.

Block 1108 may involve changing the status 824 of changeset record 820 to "commit_in_progress," signaling within the CDM that changes may be forthcoming to configuration data. The logic flow may then proceed to block 1110.

Block 1110 may involve identifying affected shared components within the CDM. In some embodiments, this may involve checking a changeset record 820, one or more linked application/library records 810, and one or more shared component records 840 to determine whether a given shared component is new, updated, or deleted. The creation, updating, or deletion of a given shared component may occur according to the workflow illustrated in FIG. 10. The logic flow may then proceed to block 1112.

Block 1112 may involve checking whether the affected shared components include newly-created shared components. If the affected shared components do include newly-created shared components, the logic flow may proceed to block 1114. If not, the logic flow may proceed to block 1116.

Block 1114 may involve creating new shared component records 840 within the CDM as part of making official the changes associated with the changeset being committed. Once this operation has completed, the logic flow may proceed to block 1116.

Block 1116 may involve checking whether the affected shared components include updated shared components. If the identified affected shared components include updated shared components, the logic flow may proceed to block 1118. If not, the logic flow may proceed to block 1120.

Block 1118 may involve updating shared component records 840 within the CDM as part of making official the changes associated with the changeset being committed. Once this operation has completed, the logic flow may proceed to block 1120.

Block 1120 may involve checking whether the affected shared components include deleted shared components. If the affected shared components include deleted shared components, the logic flow may proceed to block 1122. If not, the logic flow may proceed to block 1124.

Block 1122 may involve deleting shared component records 840 within the CDM as part of making official the changes associated with the changeset being committed. In order to avoid errors stemming from this operation, any reference to the deleted record may also be removed from other records. For example, if a shared component record 840 is removed, the shared_component_id 836 of a linked snapshot record 830 may also be deleted. Once this operation has completed, the logic flow may proceed to block 1124.

Block 1124 may involve changing the status 824 of changeset record 820 to "committed," signaling within the CDM that the requested changes have been written to a database. The logic flow may then proceed to block 1126.

Block 1126 may involve representing an end state for the logic flow of FIG. 11. A new logic flow may begin after the logic flow has reached this state.

Figure 12:
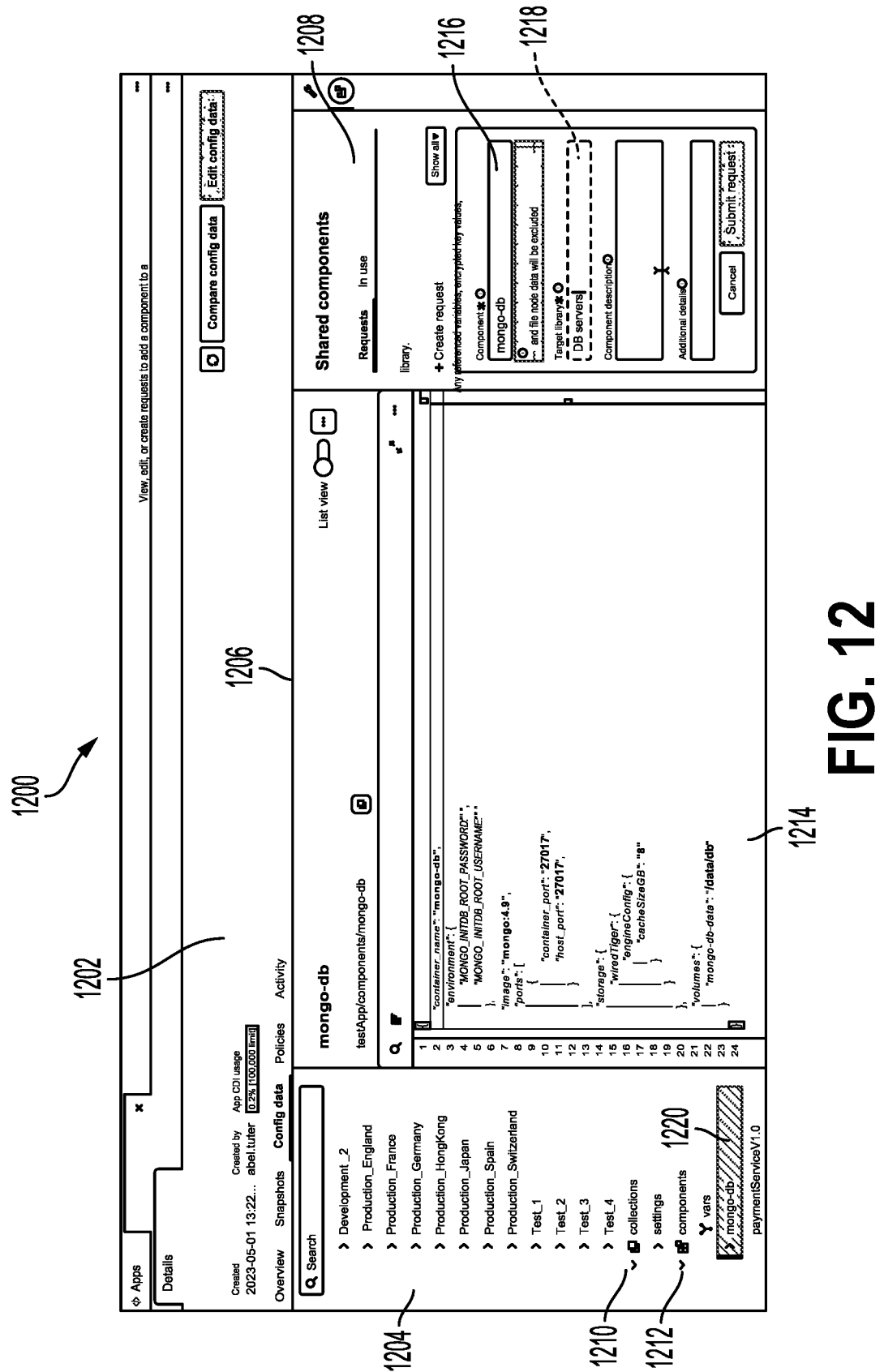
FIG. 12 depicts a user interface displaying a request to include a shared component in a shared library, in accordance with example embodiments.

FIG. 12 depicts a user interface 1200 displaying a request to include a shared component in a shared library, in accordance with example embodiments.

While FIG. 12 depicts a request being made from the perspective of a user (as opposed to an administrator), other embodiments may include the same or different user interfaces for the same operations performed by an administrator.

A user interface 1200 may comprise a ribbon 1202, a sidebar 1204, a configuration data editor panel 1206, and a shared component request menu 1208.

A ribbon 1202 may provide information regarding an application associated with a shared component and shared library. Some information displayed in ribbon 1202 may include an application title, a creation timestamp, and a creator username. This information may be represented within the CDM in an application/library record 810.

A sidebar 1204 may comprise a list of configuration data related to the example application. For example, sidebar 1204 lists collections 1210 and components 1212, in addition to several deployables. This may provide for navigation in the UI between the groups of configuration data parameters that relate to an application, as depicted in FIG. 7A.

Configuration data editor panel 1206 may be implemented in some embodiments. For example, the configuration data parameters of mongo-db component 1214 are displayed after selecting the mongo-db component 1220 in the sidebar 1204. In this panel, the configuration data parameters included in the mongo-db component 1214 are displayed in JSON format, as depicted in FIG. 6B.

A user may add new configuration data parameters, edit the configuration data parameters, or performing other operations on the configuration data parameters within the mongo-db component 1214. Saving these changes using the user interface 1200 may result in invoking the workflow depicted in FIG. 10.

Shared component request menu 1208 may allow a user to create a request to include a given shared component into a shared library. For example, a user may use component selector 1216 to search and select a component, which in some embodiments may be the component displayed in configuration data editor panel 1206.

Further, a user may use target library selector 1218 to search and select a shared library to which to include the selected shared component. In some embodiments, the user may include additional comments, for example a component description or additional details along with the request using the shared component request menu 1208.

Figure 13:
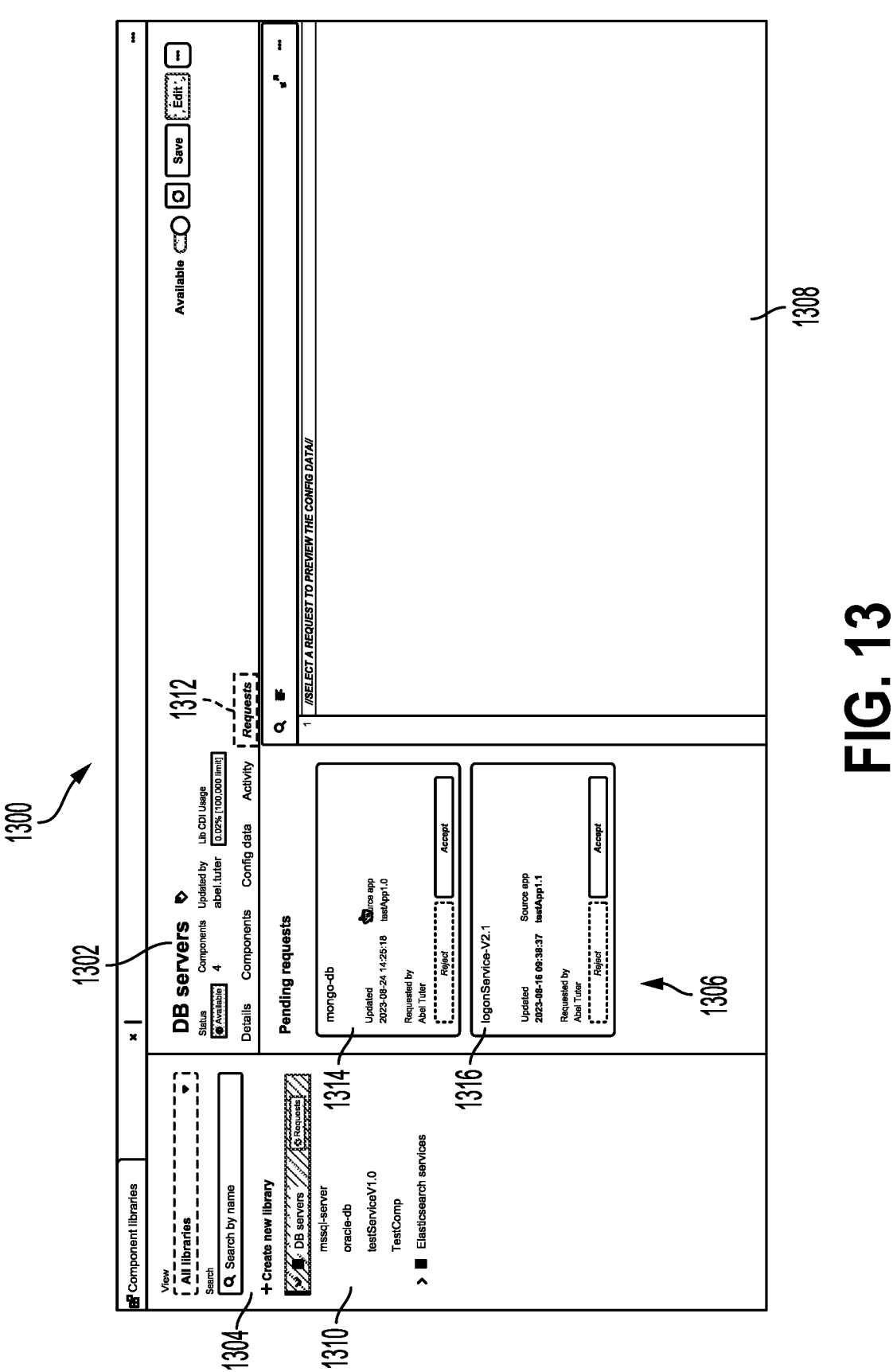
FIG. 13 depicts a user interface displaying an administrator view of a shared library, allowing the administrator to accept or reject a request to include a shared component, in accordance with example embodiments.

Submitting the request using the shared component request menu 1208 may invoke the workflow depicted in FIG. 9, and display a request for administrator approval as depicted in FIG. 13.

FIG. 13 depicts a user interface 1300 displaying an administrator view of a shared library, allowing the administrator to accept or reject a request to include a shared component, in accordance with example embodiments.

FIG. 13 depicts a user interface from the perspective of an administrator, i.e. a user with elevated privileges to make changes or to approve or deny changes to configuration data. In some embodiments, access to configuration data may be limited to specified users, administrators only, other groups of users, or any combination thereof.

User interface 1300 may comprise a ribbon 1302, a sidebar 1304, a requests listing 1306, and a configuration data preview panel 1308.

Ribbon 1302 may provide information a shared library. Some information displayed in ribbon 1302 may include a library title, a status, and a count of the components currently included in the library. This information may be represented within the CDM in an application/library record 810. In some embodiments, ribbon 1302 may include a requests tab 1312.

Sidebar 1304 may depict a list of libraries available to be viewed and/or edited by an administrator. For example, sidebar 1304 may depict the DB servers shared library 1310, and may list the components included within it. In some embodiments, the sidebar 1304 may allow a user to select a library to bring up more information regarding the library in other portions of the user interface 1300.

For example, if an administrator selects the DB servers shared library 1310 from sidebar 1304 and selects the requests tab 1312 from ribbon 1302, user interface 1300 may display requests listing 1306.

Requests listing 1306 may, in some embodiments, display requests for shared components to be included in the currently-viewed library. For example, FIG. 13 depicts the requests listing 1306 for the DB servers shared library 1310. Requests listing 1306 includes two pending requests, mongo-db request 1314 and logonService-V2.1 request 1316. Requests listed in requests listing 1306 may include information related to the associated component, including a component title, last updated timestamp, source application, and requestor identity.

An administrator may use the "accept" or "reject" buttons displayed in the request within the requests listing 1306 to perform each of these actions. In some embodiments, an administrator using one of these buttons may determine the outcome of the logic flow at block 1102 depicted in FIG. 11. This outcome may further affect the outcomes of commits made in the workflows depicted in FIGS. 9 and 10.

The selecting of a request within requests listing 1306 may cause the user interface 1300 to display a preview of the configuration data within configuration data preview panel

1308. If no request is selected, configuration data preview panel 1308 may display a default text message, as depicted in FIG. 13. Additionally, in some embodiments, a preview of the configuration data within configuration data preview panel 1308 may be displayed in JSON format, as a component may be displayed in configuration data editor panel 1214 depicted in FIG. 12.

Figure 14A:
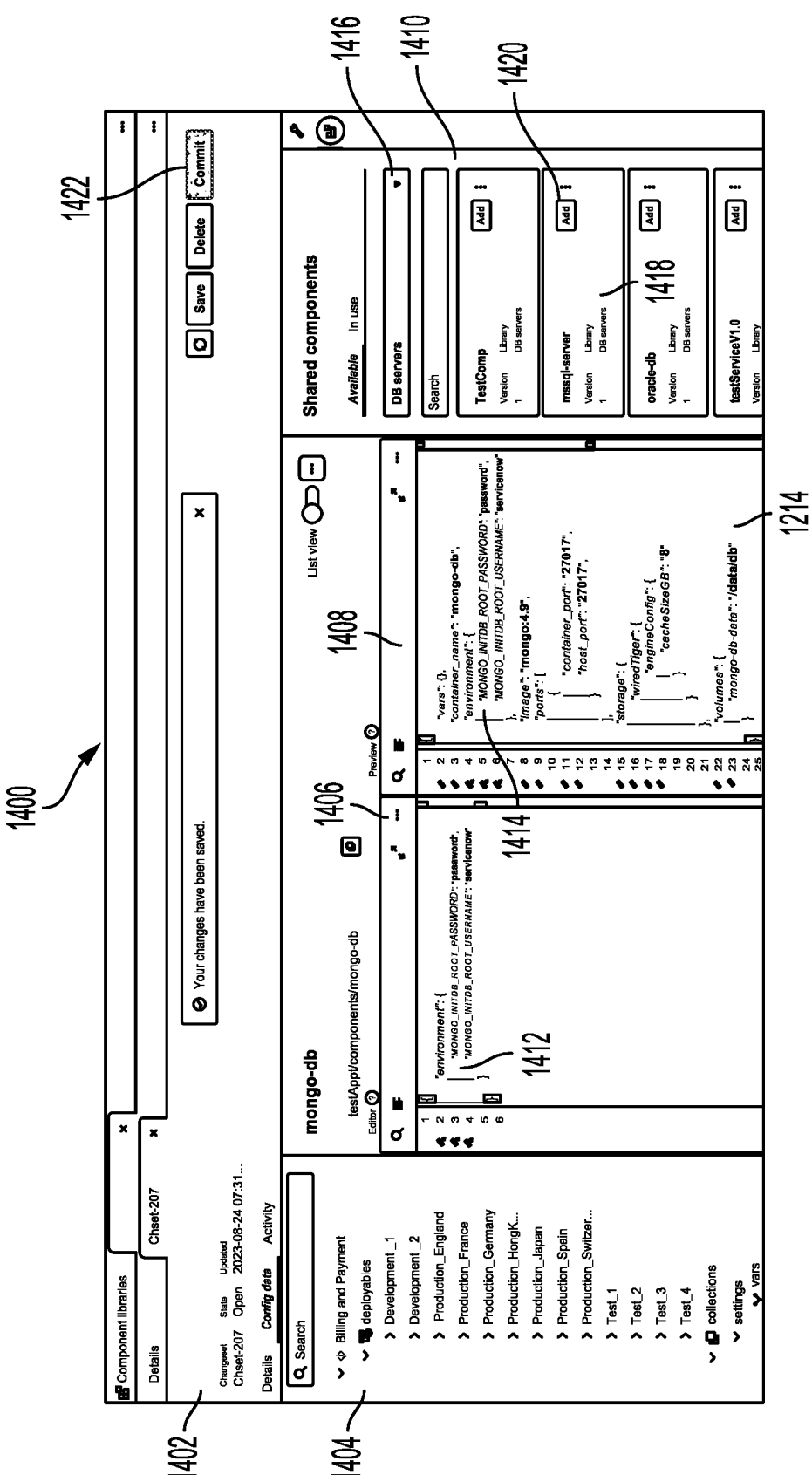
FIG. 14A depicts a user interface displaying an override editor, wherein a user may include application-specific configuration data that is different from the shared component, in accordance with example embodiments.

FIG. 14A depicts a user interface 1400 displaying an override editor, wherein a user may include application-specific configuration data parameters that may be different from the configuration data parameters included in the shared component, in accordance with example embodiments.

User interface 1400 may comprise a ribbon 1402, a sidebar 1404, an override data editor panel 1406, a configuration data preview panel 1408, and a shared components selection panel 1410.

Ribbon 1402 may provide information regarding an application associated with a shared component. Some information displayed in ribbon 1402 may include an application title, a changeset ID, and a last updated timestamp. This information may be represented within the CDM in an application/library record 810 and a changeset record 820.

Sidebar 1404 may depict a list of applications and the respective related deployables and collections. The sidebar 1404 may also include the information listed in sidebar 1202 depicted in FIG. 12, which may include libraries and libraries' included components. In some embodiments, the sidebar 1404 may allow a user to select an application, library, component, or deployable to bring up more information regarding the selection in other portions of the user interface.

For example, if a user selects the mongo-db component 1220 from the sidebar 1404 (which, as noted above, may include the information included in sidebar 1202), the configuration data parameters of the mongo-db component 1214 may be displayed in a configuration data preview panel 1408, as depicted in FIG. 14A.

User interface 1400 may also allow the user to create an override of configuration data parameters. For example, a shared component may specify certain authentication credentials. However, an application or service may require different authentication credentials, but still require the other information present in the shared component. An override allows for application/service-specific configuration data parameters without sacrificing the other benefits of shared components.

An override may be specified by the user by way of override data editor panel 1406. In FIG. 14A, the override editor panel 1406 displays the environment configuration data parameter override 1412, which will override the environment configuration data parameter 1414 depicted in the configuration data preview panel 1408. This override is limited to the application selected for user interface 1400 that may have information displayed in ribbon 1402.

User interface 1400 may also provide the ability for a user to include new shared components into an application. In some embodiments, this may be accomplished by way of shared components selection panel 1410.

A shared components selection panel 1410 may include a shared library selector 1416. A user may select the shared library from which they wish to include a shared component. In FIG. 14A, the DB servers shared library 1310 is selected.

After selecting a shared library, a shared components selection panel 1410 may display a listing of shared components within the selected shared library. Depicted is the mssql-server shared component 1418, among others. A user may, in some embodiments, select an add button 1420 to add the mssql-server shared component 1418 to an application. These changes may be written into the CDM according to the workflows in FIGS. 9 and 10 and the logic flow in FIG. 11 if the user selects the "commit" button 1422.

Figure 14B:
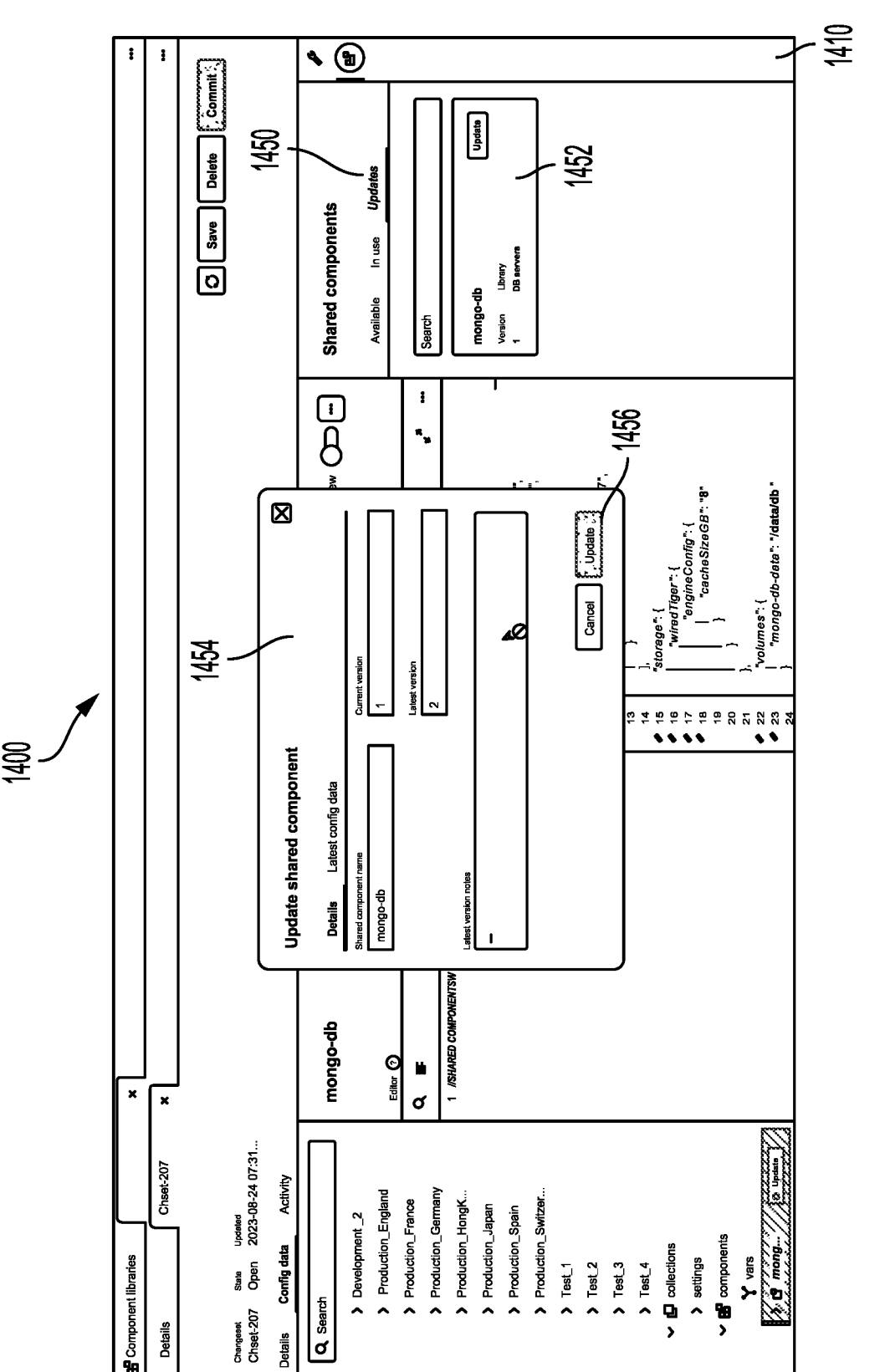
FIG. 14B depicts a user interface displaying updates to shared components, in accordance with example embodiments.

FIG. 14B depicts a user interface displaying updates to shared components, in accordance with example embodiments.

User interface 1400 may also provide a user with the ability to update the version of a shared component. This is illustrated in FIG. 14B. In some embodiments, the shared components selection panel 1410 may include an updates tab 1450.

Updates tab 1450, when selected by a user, may display a list of shared components that have a new version available for inclusion within a shared library or application. In FIG. 14B, the mongo-db component is listed as being on version 1 and within the DB servers shared library 1310.

A user viewing a listing within updates tab 1450 may select an update button 1452, which in some embodiments may cause the user interface 1400 to display an update pop-up window 1454.

Update pop-up window 1454 may display information related to the shared component that has an update available, including a shared component name, the current version number of the shared component, and the latest version number of the shared component. In FIG. 14B, the information populating the update pop-up window 1454 pertains to mongo-db component 1214, which has version 2 available.

A user may update the component referenced in update pop-up window 1454 by way of the update pop-up window update button 1456. Upon the selection of the update pop-up window update button 1456, the component may be updated according to the workflow depicted in FIG. 10.

VIII. Example Technical Improvements

These embodiments provide a technical solution to a technical problem. One technical problem being solved is misconfigurations of applications and services within a computing platform. In practice, this is problematic because configuration errors are responsible for a growing number of hours of system downtime.

In the prior art, the correction of configuration errors would require a search through each application or service that made use of the erroneous/incorrect configuration data parameter and corrections where necessary. However, these techniques are resource-intensive, consuming memory and processor resources, especially when concerning a platform that may have hundreds of affected applications or services. Thus, prior art techniques did little if anything to address configuration errors in an adequate way or at an adequate scale, or attempt to limit memory and processor resource usage.

The embodiments herein overcome these limitations by facilitating the centralization of configuration data, providing more robust methods for updating data, and avoiding unnecessary parameter duplications that are a common source for configuration errors. Shared components allow a single component of configuration data (which may be one or more specific parameters of the configuration data) to be shared between several applications or services. Thus, configuration data can be easily updated or corrected by editing only the shared component, the change of which may then be reflected among the applications or services that share it. This reduces the likelihood of configuration errors as there are less duplicated entries to become corrupted or incorrect.

Additionally, should an error occur, it can be rectified quickly and easily by editing the shared component rather than each application or service individually. In this manner, preventing and addressing configuration errors can be accomplished in a more accurate and robust fashion. This results in several advantages, including a reduction of memory and processor utilization.

Other technical improvements may also flow from these embodiments, and other technical problems may be solved. Thus, this statement of technical improvements is not limiting and instead constitutes examples of advantages that can be realized from the embodiments.

IX. Example Operations

FIG. 15 depicts a flow chart 1500 illustrating an example embodiment. The process illustrated by FIG. 15 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 15 may be simplified by the removal of any one or more of the features shown therein. Further, these embodiments may be combined with features, aspects, and/or implementations of any of the previous figures or otherwise described herein.

Block 1502 may involve obtaining a configuration data component that is associated with a first configuration data library, wherein the configuration data component indicates one or more parameters of a software service.

Block 1504 may involve providing a request for the configuration data component to be used in a second configuration data library.

Block 1506 may involve linking the configuration data component with the second configuration data library such that the configuration data component is used across the first configuration data library and the second configuration data library.

In some embodiments, the process may involve receiving, in response to the request, approval to use the configuration data component in the second configuration data library.

In some embodiments, the process may involve overriding a value of a specific parameter of the configuration data component to an overridden value, wherein the specific parameter is to be used with the second configuration data library but not the first configuration data library.

In some embodiments, the linking of the configuration data component may involve linking the overridden value of the specific parameter to the second configuration data library but not the first configuration data library.

The embodiments may further involve providing, to a client device by way of a graphical user interface, a representation of the configuration data component as shared, wherein the graphical user interface includes a first menu allowing selection of the configuration data component, a panel displaying the one or more parameters of the configuration data component, and a second menu allowing performance of an action associated with the configuration data component, wherein the action involves including the configuration data component in a further configuration data library, including the configuration data component in an application or service, or updating the configuration data component.

The embodiments may further involve receiving, by way of the second menu, an update request for updating the configuration data component, and providing, by way of the graphical user interface, a pop-up window allowing the updating of the configuration data component.

In some embodiments, the configuration data component is used by an application or service.

The embodiments may further involve providing a change request for a specific parameter of the one or more parameters to be updated to a new value and receiving, in response to the change request, approval to update the specific parameter.

In some embodiments, the change request may include a changeset that refers to a list of updates made to the one or more parameters as part of the change request.

The embodiments may further involve storing, in a database, a snapshot representing a version of the one or more parameters after the one or more parameters have been updated. In some embodiments, the snapshot may be a static representation of the one or more parameters at a specific time at which the snapshot was stored.

In some embodiments, the one or more parameters may be in XML format or JSON format.

In some embodiments, the one or more parameters may be stored in a database, and the database may include a node table containing node records of types and values of the one or more parameters, an application table containing application records associated with applications or libraries, and a shared component table containing shared component records associated with shared configuration data components.

In some embodiments, the application records and the shared component records may respectively include unique identifiers of the node records.

In some embodiments, the shared component records may respectively include unique identifiers of the application records.

In some embodiments, the database may include a changeset table containing changeset records associated with changesets and at least one of the changesets may refer to a list of updates made to the one or more parameters.

In some embodiments, the changeset records may respectively include unique identifiers of the application records.

In some embodiments, the database may include a snapshot table containing snapshot records associated with snapshots, and a snapshot may be a static representation of parameters at specific times at which each of the respective snapshots was stored.

In some embodiments, the snapshot records may respectively include unique identifiers of the changeset records.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

obtaining a configuration data component that is associated with a first configuration data library, wherein the configuration data component indicates one or more parameters of a software service;

providing a request for the configuration data component to be used in a second configuration data library;

linking the configuration data component with the second configuration data library such that a single instance of the configuration data component is shared by the first configuration data library and the second configuration data library;

updating the single instance of the configuration data component; and reflecting, in the first configuration data library and the second configuration data library, updates to the single instance of the configuration data component.

2. The method of claim 1, further comprising:

receiving, in response to the request, approval to use the configuration data component in the second configuration data library.

3. The method of claim 1, further comprising:

overriding a value of a specific parameter of the configuration data component to an overridden value, wherein the specific parameter is to be used with the second configuration data library but not the first configuration data library.

4. The method of claim 3, wherein linking the configuration data component comprises linking the overridden value of the specific parameter to the second configuration data library but not the first configuration data library.

5. The method of claim 1, further comprising:

providing, to a client device by way of a graphical user interface, a representation of the configuration data component as shared, wherein the graphical user interface includes:

(i) a first menu allowing selection of the configuration data component;

(ii) a panel displaying the one or more parameters of the configuration data component; and (iii) a second menu allowing performance of an action associated with the configuration data component, wherein the action involves including the configuration data component in a further configuration data library, including the configuration data component in an application or service, or updating the configuration data component.

6. The method of claim 5, further comprising:

receiving, by way of the second menu, an update request for updating the configuration data component; and providing, by way of the graphical user interface, a pop-up window allowing the updating of the configuration data component.

7. The method of claim 1, wherein the configuration data component is used by an application or service.

8. The method of claim 1, further comprising:

providing a change request for a specific parameter of the one or more parameters to be updated to a new value; and receiving, in response to the change request, approval to update the specific parameter.

9. The method of claim 8, wherein the change request includes a changeset that refers to a list of updates made to the one or more parameters as part of the change request.

10. The method of claim 8, further comprising:

storing, in a database, a snapshot representing a version of the one or more parameters after the one or more parameters have been updated, wherein the snapshot is a static representation of the one or more parameters at a specific time at which the snapshot was stored.

11. The method of claim 1, wherein the one or more parameters are stored in a database, and wherein the database includes:

a node table containing node records of types and values of the one or more parameters;

an application table containing application records associated with applications or libraries; and a shared component table containing shared component records associated with shared configuration data components.

12. The method of claim 11, wherein the application records and the shared component records respectively include unique identifiers of the node records.

13. The method of claim 11, wherein the shared component records respectively include unique identifiers of the application records.

14. The method of claim 11, wherein the database further comprises:

a changeset table containing changeset records associated with changesets, and wherein at least one of the changesets refers to a list of updates made to the one or more parameters.

15. The method of claim 14, wherein the changeset records respectively include unique identifiers of the application records.

16. The method of claim 14, wherein the database further comprises:

a snapshot table containing snapshot records associated with snapshots, wherein a snapshot is a static representation of parameters at specific times at which each of the respective snapshots was stored.

17. The method of claim 16, wherein the snapshot records respectively include unique identifiers of the changeset records.

18. A computing system comprising:

one or more processors;

memory; and program instructions, stored in the memory, that upon execution by the one or more processors cause the computing system to perform operations comprising:

obtaining a configuration data component that is associated with a first configuration data library, wherein the configuration data component indicates one or more parameters of a software service;

providing a request for the configuration data component to be used in a second configuration data library;

linking the configuration data component with the second configuration data library such that a single instance of the configuration data component is shared by the first configuration data library and the second configuration data library;

updating the single instance of the configuration data component; and reflecting, in the first configuration data library and the second configuration data library, updates to the single instance of the configuration data component.

19. A non-transitory computer-readable medium storing program instructions that, when executed by one or more processors of a computing system, cause the computing system to perform operations comprising:

obtaining a configuration data component that is associated with a first configuration data library, wherein the configuration data component indicates one or more 5 parameters of a software service;

providing a request for the configuration data component to be used in a second configuration data library;

linking the configuration data component with the second configuration data library such that a single instance of 10 the configuration data component is shared by the first configuration data library and the second configuration data library;

updating the single instance of the configuration data component; and 15 reflecting, in the first configuration data library and the second configuration data library, updates to the single instance of the configuration data component.

\* \* \* \* \*